United States Patent [19]
Aoyama et al.

[11] Patent Number: 6,055,958
[45] Date of Patent: May 2, 2000

[54] INTAKE CONTROL SYSTEM FOR GENERATING TUMBLE ACTION

[75] Inventors: Tateo Aoyama; Masahiro Uchida, both of Iwata, Japan

[73] Assignee: Yamaha Hatsudoki Kabushiki Kaisha, Iwata, Japan

[21] Appl. No.: 08/391,421

[22] Filed: Feb. 16, 1995

[30] Foreign Application Priority Data

Feb. 17, 1994 [JP] Japan ..................................... 6-020171

[51] Int. Cl.[7] ...................................................... F02B 31/00
[52] U.S. Cl. ...................... 123/308; 123/184.55; 123/432
[58] Field of Search .................................. 123/308, 302, 123/432, 184.55, 336

[56] References Cited

U.S. PATENT DOCUMENTS

| | | | |
|---|---|---|---|
| 4,570,590 | 2/1986 | Kawai et al. | 123/308 |
| 4,617,896 | 10/1986 | Yoshikawa . | |
| 4,627,400 | 12/1986 | Takata et al. | 123/432 |
| 4,664,076 | 5/1987 | Miyano et al. | 123/184.55 |
| 4,667,636 | 5/1987 | Oishi et al. | 123/308 |
| 5,119,784 | 6/1992 | Hashimoto et al. | 123/432 |
| 5,273,014 | 12/1993 | Mitobe et al. | 123/308 |

FOREIGN PATENT DOCUMENTS

| | | |
|---|---|---|
| 0449240 | 10/1991 | European Pat. Off. . |
| 480393A1 | 10/1991 | European Pat. Off. . |
| 3600408 | 7/1987 | Germany . |
| 4108469 | 9/1991 | Germany . |
| 3-160114 | 7/1991 | Japan .................................... 123/308 |

OTHER PUBLICATIONS

European Search Report dated Jun. 15, 1995.
Patent Abstracts of Japan—vol. 11 No. 114 (M–579) Apr. 10, 1987 & JP–A–61 258921 (Kubota Ltd) Nov. 17, 1986.
Patent Abstracts of Japan—vol. 9 No. 245 (M–418) Oct. 2, 1986 & JP–A–60 098125 (Mazda K.K.) Jun. 1, 1985.
Patent Abstracts of Japan—vol. 10 No. 181 (M–492) Jun. 25, 1986 & JP–A–61 028714 (Fuji Heavi Ind Ltd) Feb. 8, 1986.
Patent Abstracts of Japan—vol. 12 No. 39 (M–665) Feb. 5, 1988 & JP–A–62 191624 (Nissan Motor Co Ltd) Aug. 22, 1987.
Patent Abstracts of Japan—vol. 9 No. 326 (M–441) Dec. 21, 1985 & JP–A–60 159934 (Madza KK) Aug. 20, 1985.
Patent Abstracts of Japan—vol. 11 No. 318 (M–632) Oct. 16, 1987 & JP–A–62 101822 (Honda Motor Co Ltd) May 12, 1987.

*Primary Examiner*—Noah P. Kamen
*Attorney, Agent, or Firm*—Knobbe, Martens, Olson & Bear LLP

[57] ABSTRACT

A control valve arrangement for a three-valve-per-cylinder internal combustion engine. The control valve arrangement controls not only the effective length of the intake passage serving each combustion chamber, but also controls the flow through the intake passage so as to generate turbulence under low-speed and low-load conditions. The control valve further includes a pair of valves which change not only the effective flow area, but also the effective flow direction. In this way varying degrees and types of turbulence can be generated during different engine running conditions. A number of different types of valve arrangements are disclosed.

43 Claims, 23 Drawing Sheets

INTAKE CONTROL SYSTEM FOR GENERATING TUMBLE ACTION

BACKGROUND OF THE INVENTION

This invention relates to an intake control system for an engine, and more particularly to an improved induction system and control therefor that improves the performance of the engine throughout its entire speed and load ranges by selectively inducing turbulence in the intake charge.

As is well known, the design of the induction system for an engine has a substantial effect on its performance. Unfortunately, induction systems that provide good high-speed performance and maximum power outputs provide extremely poor running under low and mid-range conditions. The reason for this is that the induction system, in order to provide maximum output, should have high volumetric efficiency. This requires an induction system that delivers the charge into the combustion chamber at a relatively high velocity and with very low flow restriction and turbulence. However, this type of induction system causes the air charge to enter the combustion chamber at a very slow rate when running at low and mid-range speeds. In addition, the charge flows into the chamber in such a way that very little turbulence is generated. As a result, flame propagation is slow and poor performance, particularly in the areas of fuel economy and exhaust emission control, result.

In order to improve the performance throughout the entire speed and load ranges, various types of variable intake systems have been proposed. These systems are variable in effect, so that they function efficiently under both high- and low-speed conditions. Frequently, this variation in tuning of the induction system is achieved by varying the effective length of the induction system. These arrangements are very effective for their purpose.

However, the basic configuration of the ports which serve the engine with such variable systems is normally such that the port is substantially unrestricted and does not induce any swirl or tumble to the intake charge. As a result, even though the flow velocity may be increased at low speeds, insufficient turbulence is generated to the charge so as to achieve the desired flame propagation.

Other types of induction systems have been proposed that include flow modifying arrangements that are disposed in either the intake passage or the intake port adjacent the intake valve. These systems use a type of flow control valve which can be positioned so as to redirect the charge entering the combustion chamber under low speed and low load conditions to generate the desired type of turbulence. Again, these systems are effective for their purpose, but do not completely solve the problem of maintaining optimum efficiency under all running conditions.

It is, therefore, a principal object of this invention to provide an improved intake control system for an internal combustion engine.

It is a further object of this invention to provide an improved induction system for an engine that can improve the performance under all running conditions.

It is a further object of this invention to provide an induction system for an engine which provides not only variable tuning for varying engine speeds and loads, but also which can introduce tumble and/or swirl into the intake charge under certain running conditions so as to further increase the turbulence in the combustion chamber.

A system is disclosed in the copending application entitled "Intake Control System," Ser. No. 08/363,746, filed Dec. 23, 1994 in the names of Kenichi Sakurai, Masami Wada, and Masato Mishigaki and assigned to the assignee hereof wherein the induction system is provided with a variable effective length for tuning for different engine speeds and loads and also a control valve arrangement for generating turbulence in the combustion chamber under certain running conditions. Although that system is very effective, it is believed that further improvements in performance can be obtained.

Specifically, the arrangement shown in that application provide, in most embodiments, a control valve that controls the flow to the combustion chamber through a single intake passage. Hence, the control valve exerts an influence over the total charge that is flowing into the cylinder. When this is employed with multiple intake valves, as shown in that application, then only certain types of turbulence can be generated in the combustion chamber. Another embodiment is shown in that application wherein there are a pair of intake passage sections which serve different valve seats associated with a single combustion chamber and the control valve either permits or precludes flow through one of these intake passages. This arrangement also limits the amount and type of turbulence which can be generated in the combustion chamber.

It is, therefore, a principal object of this invention to provide an improved induction system for an engine wherein greater control is permitted over the induction system characteristics.

It is a further object of this invention to provide an improved induction control system for an engine and particularly one having multiple intake valves.

It is a still further object of this invention to provide an induction control system for an engine wherein the system can be tuned for different running conditions and wherein different types of flow conditions into the cylinder is possible under varying running conditions.

As will become apparent, a feature of this invention embodies an arrangement wherein the intake passage for each cylinder is divided into a pair of delivery sections which cooperate with different valves for that cylinder so as to provide a wider range of control. A throttle valve is provided in one of these intake passage sections and a flow control valve is provided in the other section. The use of both a throttle and a flow control valve permits a wider latitude in the flow conditions into the cylinder under varying speed and load ranges.

However, by utilizing such arrangements it is necessary to provide two separate controls for each of the valves and separate valve shafts for their operation.

This obviously complicates the engine and its control structure.

It is, therefore, a still further object of this invention to provide an improved control valve arrangement for the individual cylinders of an engine.

It is a further object of this invention to provide an improved and simplified control and throttle valve arrangement for separate passages serving the same combustion chamber of an engine.

SUMMARY OF THE INVENTION

A first feature of this invention is adapted to be embodied in an induction control system for supplying a charge to an engine combustion chamber which comprises an intake passage means which terminates at port openings in the combustion chamber. The intake passage means has first and second outlet sections divided by a wall. A throttle valve is provided in at least one of the outlet sections for controlling the flow through the one outlet section and is movable from a closed to an open position. A flow control valve is positioned in the other of the sections and is movable between a first position wherein the flow entering the combustion chamber flows in a first flow path and a second position where the flow enters the combustion chamber in a second flow path.

Another feature of the invention is adapted to be embodied in an induction control system for supplying a charge to an engine combustion chamber through at least two intake passages. A first intake passage serves a first of the intake ports and a second intake passage serves a second of the intake ports. A first valve shaft extends through the first and second intake passages. A first valve is affixed for rotation with the first valve shaft in the first intake passage. A second tubular valve shaft is journaled around the first valve shaft and extends through the first and second intake passages. A second valve is affixed to the second tubular valve shaft in the second intake passage.

Another feature of the invention is adapted to be embodied in an induction control system for supplying a charge to an engine combustion chamber through at least two intake ports. A first intake passage serves a first of the intake ports and a second intake passage serves the second of the intake ports. First and second valve shafts extend through the first and second intake ports respectively and are rotatable about parallel axes. A first valve is affixed for rotation with the first valve shaft in the first intake passage and a second valve is affixed for rotation with the second valve in the second intake passage.

DETAILED DESCRIPTION OF THE PREFERRED EMBODIMENTS OF THE INVENTION

Figure 1:
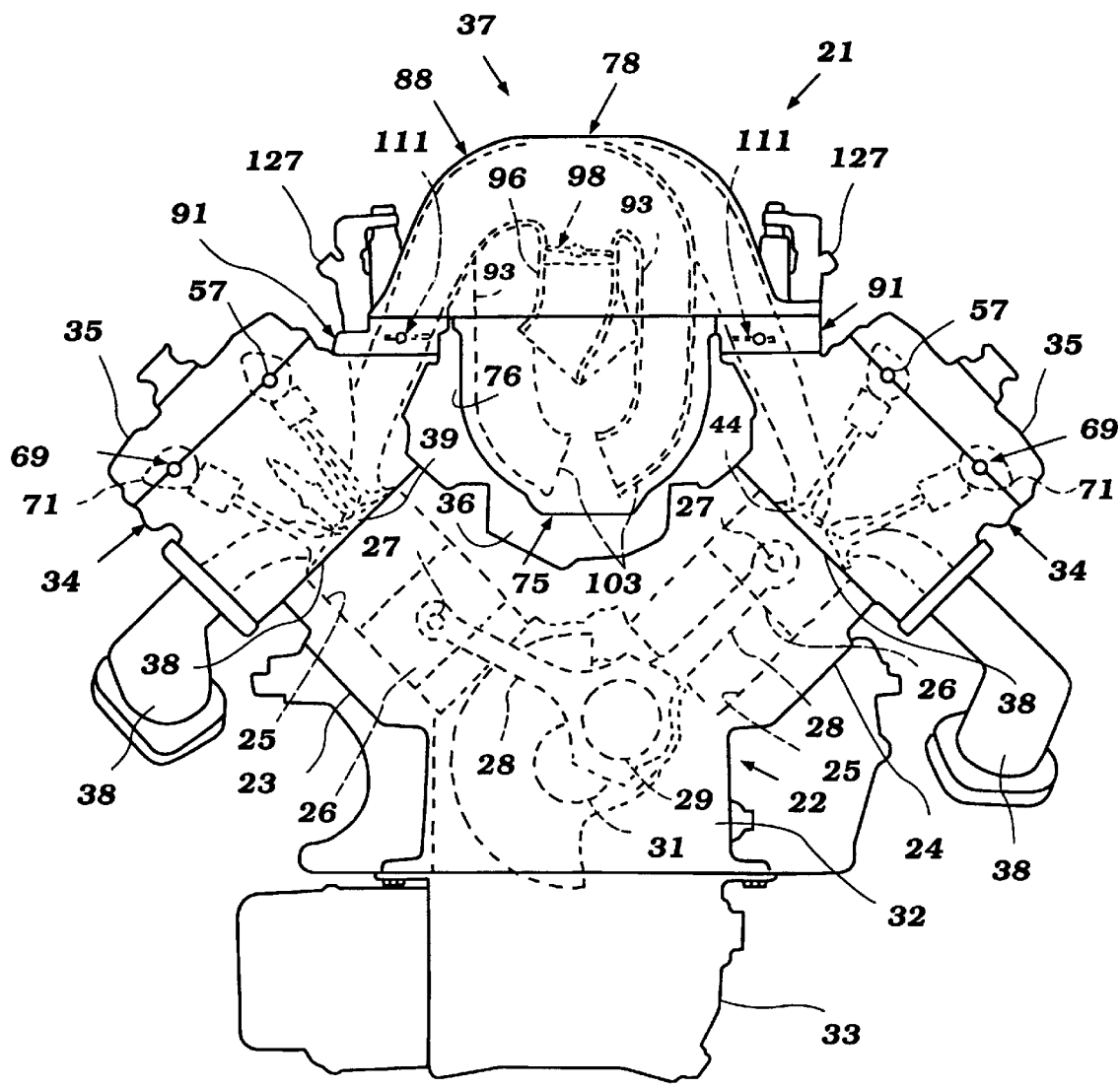
FIG. 1 is a front elevational view of an internal combustion engine constructed in accordance with an embodiment of the invention.

Referring now in detail to the drawings and initially to FIG. 1, an internal combustion engine constructed in accordance with an embodiment of the invention is indicated generally by the reference numeral 21. As will become apparent, the engine 21 is of the V-8 type and operates on a four-stroke principle. Although the invention is described in conjunction with such an engine, it will be readily apparent to those skilled in the art that certain facets of the invention may be employed with engines having other cylinder numbers and other cylinder configurations. It is believed well within the scope of those skilled in the art to understand how the features of the invention may be employed with such other engines.

The engine 21 is comprised of a cylinder block, indicated generally by the reference numeral 22, having two angularly inclined cylinder banks 23 and 24, each of which is formed with four respective cylinder bores 25. In the illustrated embodiment, the angle between the cylinder banks 23 and 24 is 90°.

Pistons 26 are slidably supported within each of the cylinder bores 25. These pistons 26 are connected by means of piston pins 27 to the upper or small ends of respective connecting rods 28. As is typical with V-type engine practice, the cylinder bank 23 is staggered slightly in an axial direction relative to the cylinder bank 24 so that the connecting rods 28 of respective cylinders of the banks 23 and 24 can be journaled on common throws 29 of a crankshaft 31. The crankshaft 31 is rotatably journaled in a well-known manner within a crankcase chamber formed by a skirt 32 of the cylinder block 22 and a crankcase member 33 that is detachably affixed thereto in a known manner.

The construction of the cylinder block 22 and those components which are contained within it and the crankcase member 33 may be considered to be conventional. Since the invention deals primarily with the induction control system, to be described later, further details of the construction of the lower portion of the engine is not believed to be necessary to permit those skilled in the art to practice the invention. For that reason, further description of these conventional components will not be made.

Cylinder heads 34 are affixed to each of the cylinder banks 23 and 24 in a conventional manner. The detailed construction of the cylinder heads 34 and the mechanisms contained therein will be described later by reference to FIG. 2 and a related, copending application. Cam covers 35 are affixed to the cylinder heads 34 in a manner which will also be described.

It should be noted that the cylinder banks 23 and 24 and the attached cylinder heads 34 and attached cam covers 35 define a valley between them, which valley is indicated generally by the reference numeral 36. An induction system, indicated generally by the reference numeral 37 and which also will be described later in more detail by reference to the remaining figures since it embodies the invention, is disposed in this valley 36 for supplying a fuel-air charge to the individual combustion chambers of the engine 21.

Exhaust manifolds 38 are affixed to the outer sides of the cylinder heads 34 and discharge the exhaust gases to the atmosphere through any conventional type of exhaust system (not shown).

The configuration of the combustion chambers for the invention will now be described by primary reference to FIG. 2. It should be initially noted that the cylinder heads 34 for each of the cylinder banks 23 and 24 are substantially identical in construction, with the cylinder head 34 for the bank 23 being placed onto the bank 23 in the one direction. When the same cylinder head 34 is attached to the cylinder bank 24, the head 34 will be reversed from this position. This permits the use of a single casting for both sides of the engine 21 with obvious cost advantages.

The cylinder head 34 has a lower sealing surface 38 that is affixed to the upper end of the respective cylinder block 23 or 24 in a manner which will be described so as to effect a tight gas seal therewith. The cylinder head surface 38 is provided with individual recesses 39 which cooperate with the cylinder bores 25 and the heads of the pistons 26 to form the combustion chambers for the engine 21. In a preferred form, the combustion chambers have a generally lens-shaped configuration, as described in the copending application of Masaaki Yoshikawa, entitled "Engine Combustion Chamber and Air Intake Device," Ser. No. 08/354,539, filed Dec. 13, 1994, and assigned to the assignee hereof. Where any details of the combustion chamber configuration are not described herein, reference may be had to that copending application, the disclosure of which is incorporated herein by reference, for such details.

Figure 2:
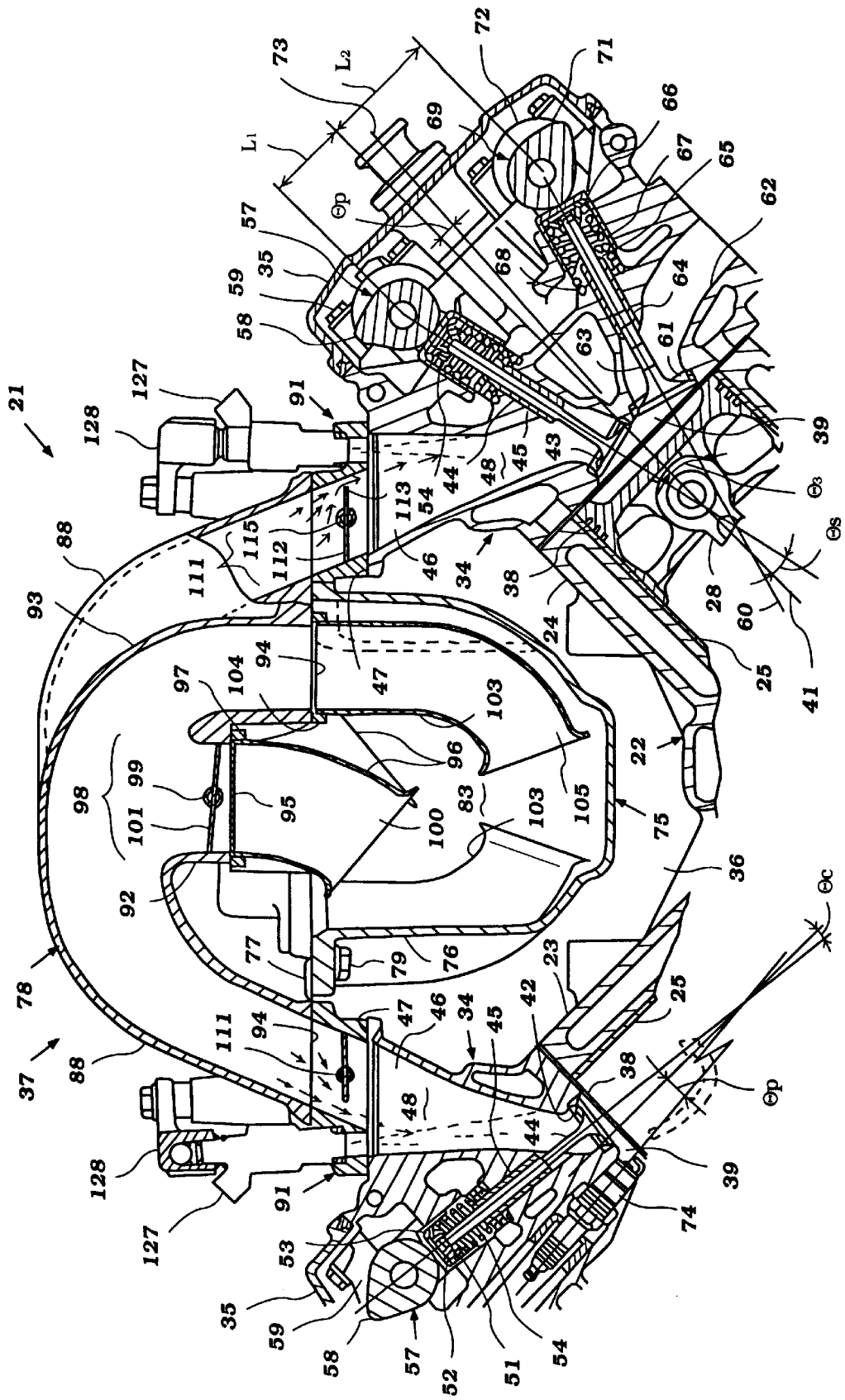
FIG. 2 is a partial cross-sectional view taken through the cylinder head and induction system for the engine along a plane that extends transversely and which passes through one cylinder bore of each bank.
Figure 3:
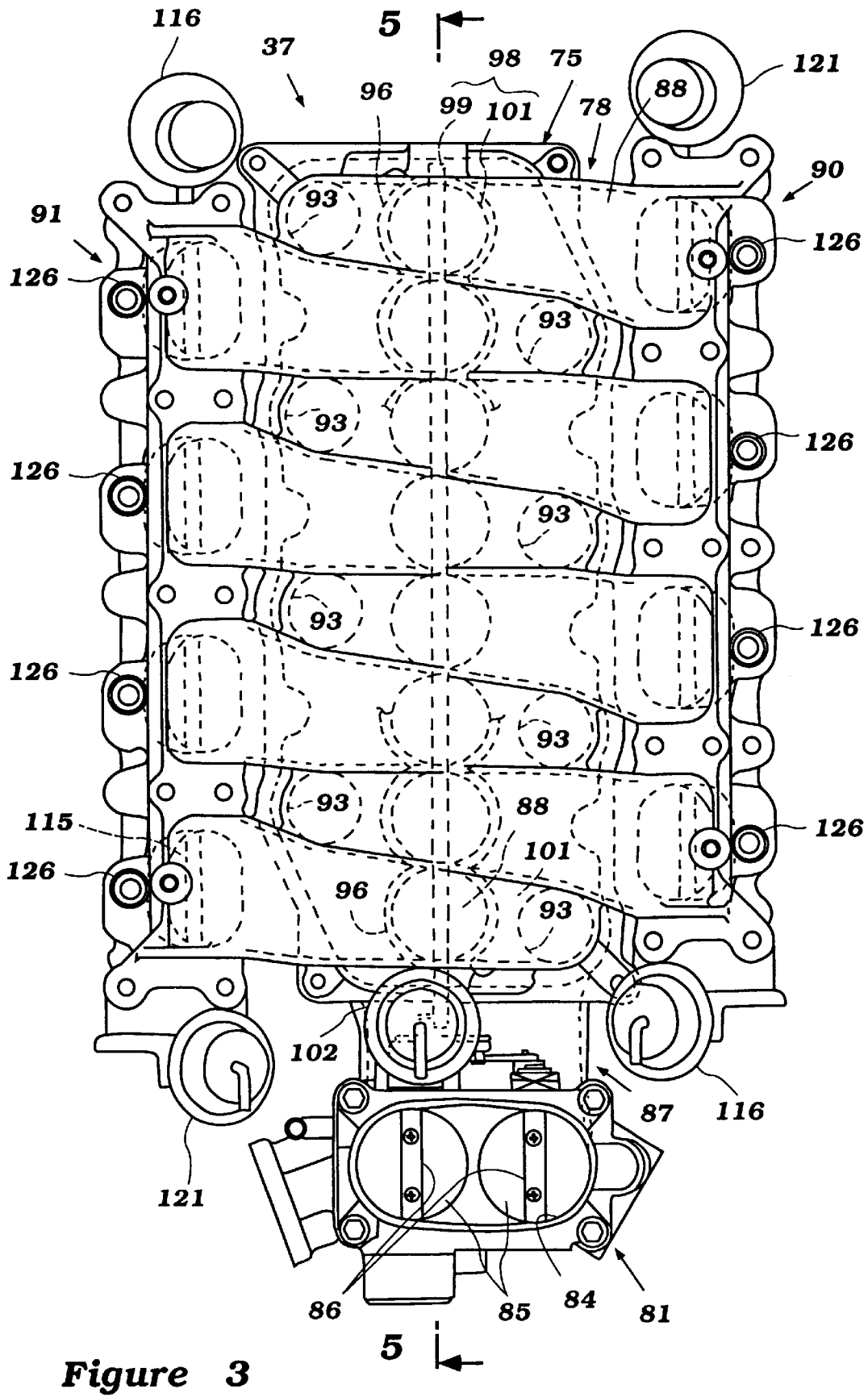
FIG. 3 is a top plan view of the intake manifold and throttle control for the engine.
Figure 4:
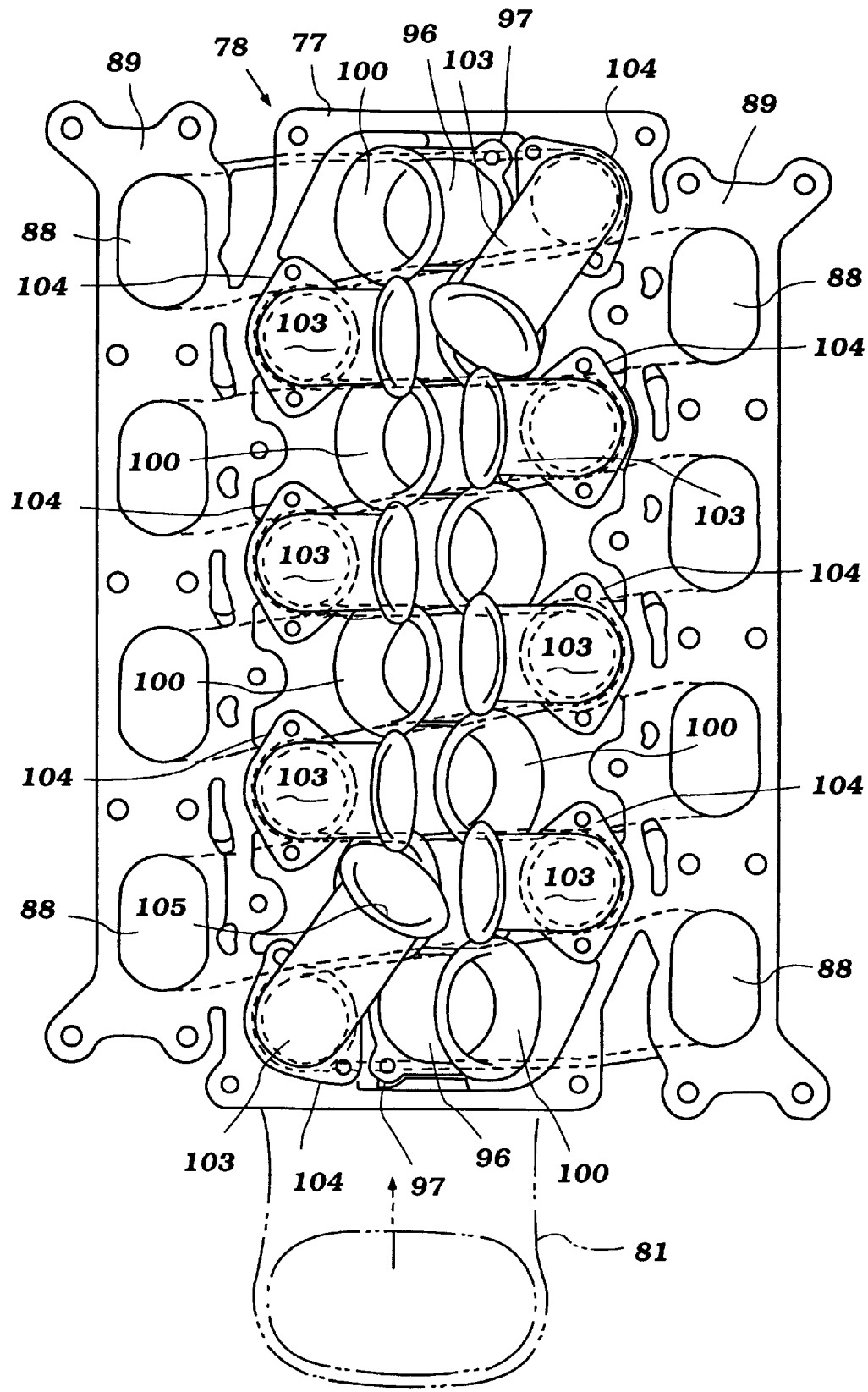
FIG. 4 is a bottom plan view of the structure shown in FIG. 3, but deleting the flow-controlling valves and plenum chamber lower closure to show the interior configuration of the plenum chamber.
Figure 5:
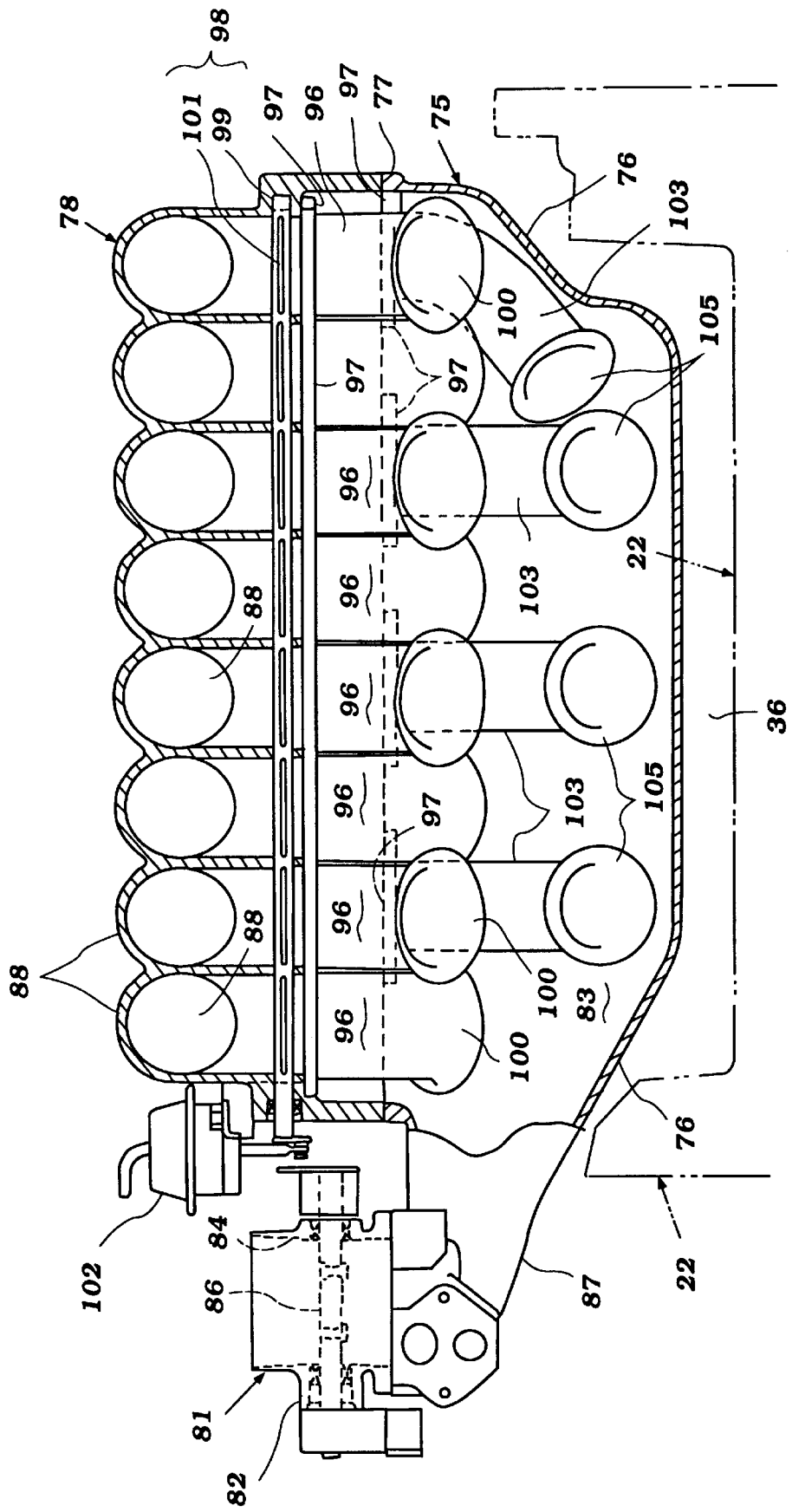
FIG. 5 is a cross sectional view of the intake manifold and throttle valve assembly, taken along the line 5—5 of FIG. 3.

The axes of the individual cylinder bores 25 are indicated in FIG. 2 and identified by the reference numeral 41 for orientation purposes. On one side of a plane containing the cylinder bore axis 41 there is provided a center intake valve seat 42, and this appears in FIG. 2 at the left-hand side of the figure and also in FIG. 6. This intake valve seat 42 is disposed generally on the outer periphery of the cylinder bore 25 and is spaced the greatest distance from the cylinder bore axis 41.

A further pair of side intake valve seats 43 are disposed closer to the cylinder bore axis 41, but are positioned so as to extend in part across the aforenoted plane containing the cylinder bore axis 41. This is shown on the right-hand side of FIG. 2 and also in FIG. 6.

Respective poppet-type intake valves 44 are slidably supported in the cylinder head 34 by pressed or cast-in guides 45 and control the flow through the valve seats 42 and 43. The reciprocal axis of the intake valve 44 associated with the center valve seat 42 is disposed at an acute angle $\theta_c$ to a plane 46, which plane is parallel to the cylinder bore axis 41 and to the aforenoted plane containing it. This plane 46 is offset from the plane containing the cylinder bore axis 41 toward the valley 36 between the cylinder banks 23 and 24.

The intake valves 44 associated with the side intake valve seats 42 have their reciprocal axes lying in a common plane. This plane is also disposed at an acute angle to the plane 46 and the plane for containing the axis 41. This acute angle, indicated by the dimension $\theta_s$, is greater than the acute angle $\theta_c$.

Figure 6:
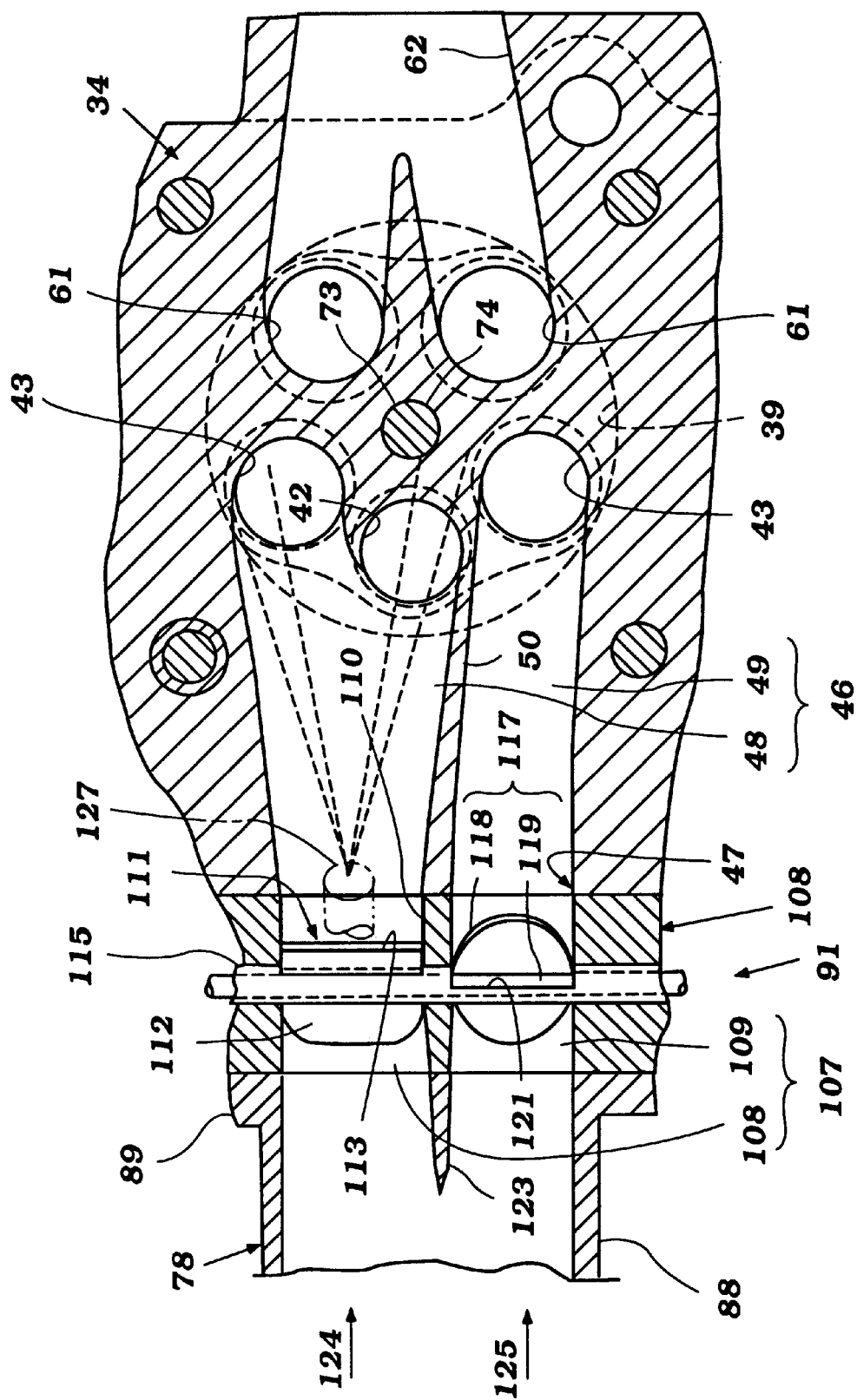
FIG. 6 is a cross-sectional view taken through one of the cylinder heads, the control valve assembly and the intake manifold portion associated therewith.
Figure 7:
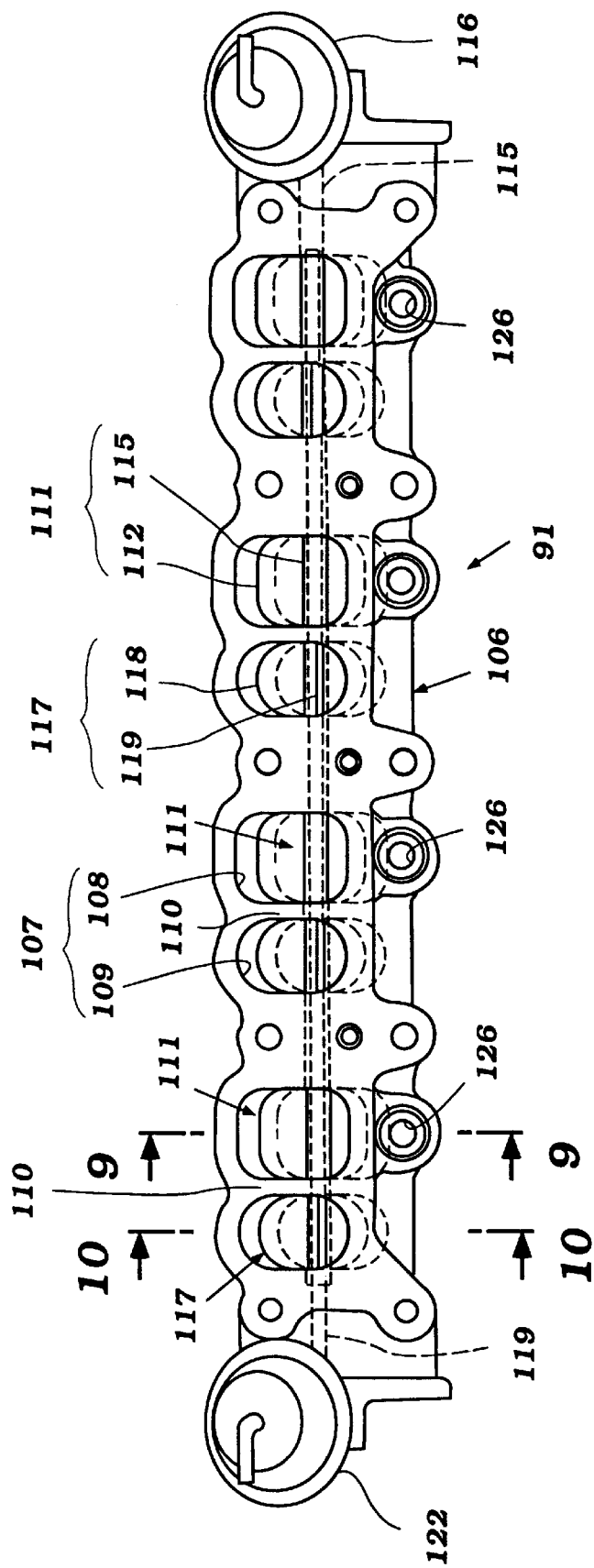
FIG. 7 is a view looking at one face of one of the control valve assemblies.
Figure 8:
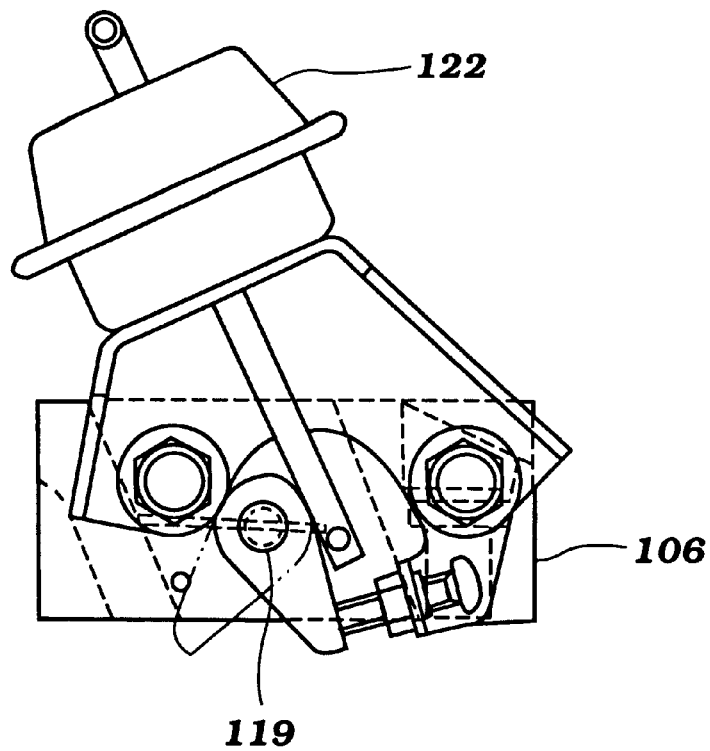
FIG. 8 is an end view of one control valve assembly.
Figure 9:
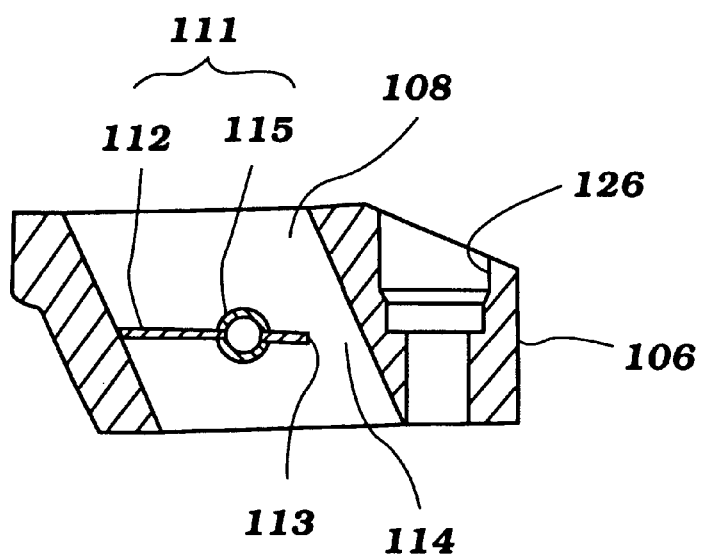
FIG. 9 is a cross-sectional view taken along the line 9—9 of FIG. 7.
Figure 10:
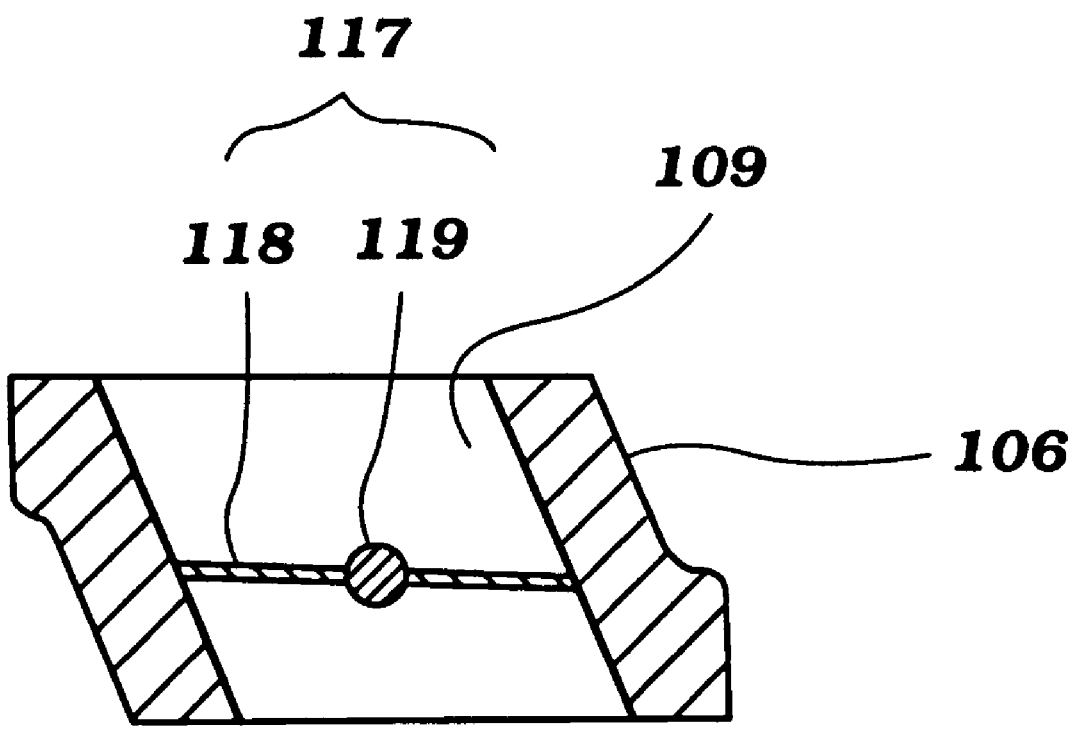
FIG. 10 is a cross-sectional view taken along the line 10—10 of FIG. 7.
Figure 11:
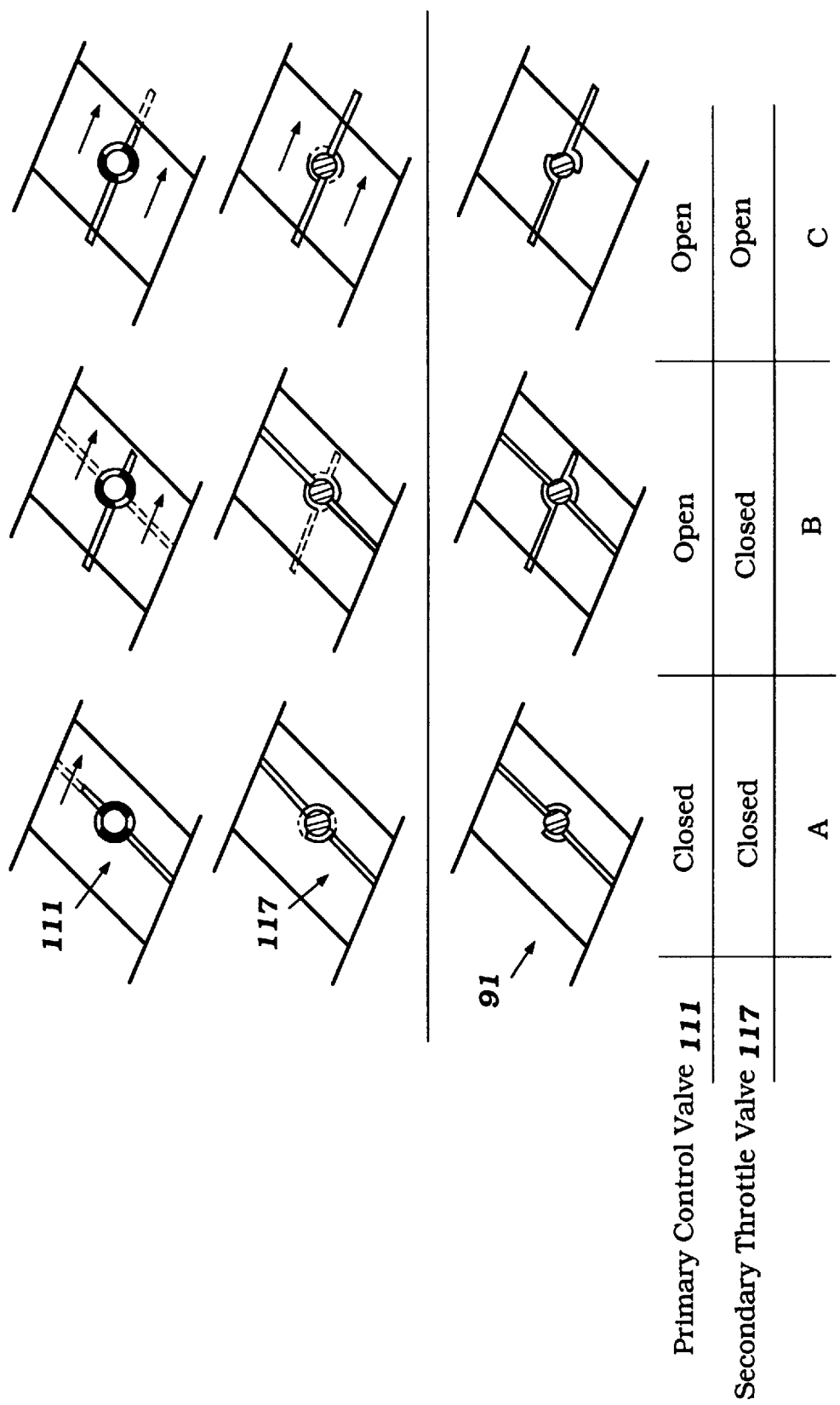
FIG. 11 is a graphical view showing the condition of the control valve and throttle valve of the assembly under a variety of running conditions.

An intake passage arrangement, indicated generally by the reference numeral 46, extends from an outer surfaces 47 of the cylinder heads 34 on the side adjacent the valley 36 and is served by the intake system 37 in a manner which will be described. The intake passage arrangement 46 includes a Siamesed-type passage 48 that serves the center intake valve seat 42 and one of the side intake valve seats 43 (FIG. 6). A further intake passage 49 extends from the cylinder head surface 47 and terminates at the remaining side intake valve seat 43. The passages 48 and 49 are separated from each other by a wall 50.

Referring again to FIG. 2, coil compression springs 51 encircle the stems of the intake valves 44 and bear against machined surfaces on the cylinder head 34 and keeper retainer assemblies 52 fixed to the upper ends of the stems of the valves 44 for urging the valves 44 to their closed positions. Thimble tappets 53 are slidably supported in tappet-receiving bores 54 formed in the cylinder head 34 for actuating the valves 44. The bores 54 are disposed at the same angle as the reciprocal axes of their respective valve stems 44.

An intake camshaft, indicated generally by the reference numeral 57, is rotatably supported in the cylinder head 34 in a manner which will be described. This intake camshaft 57 is driven in a manner which will also be described at one-half crankshaft speed. The intake camshaft 57 is provided with three cam lobes 58 for each cylinder which it serves and which are spaced apart by bearing surfaces. These bearing surfaces are, in turn, journaled in the cylinder head 54 in bearings formed integrally in the cylinder head.

The intake camshaft 57 is supported for rotation by bearing caps 59 that are affixed to the cylinder head 34 in the manner described in our copending application entitled "Cylinder Head Arrangement for Multi-Valve Engine," Ser. No. 08/363,412, filed Dec. 23, 1994, and assigned to the assignee hereof. In fact, that copending application discloses further details of the construction of the cylinder head 34, the way in which the tappet-receiving bores 54 are formed, and other details of the cylinder head arrangement. That disclosure is incorporated herein by reference. Since this invention deals primarily with the induction system for the engine, it is believed that the details of the construction of the cylinder heads except for what are given herein are not necessary for those skilled in the art to practice the invention.

Continuing to refer to FIG. 2 and also to FIG. 6, a pair of exhaust valve seats 61 are formed in the cylinder head recesses 39 on the side of the plane 41 opposite to the center intake valve seat 42. These side exhaust valve seats 61 are formed at the beginning of a Siamesed exhaust passage 62, which extends through the exhaust side of the cylinder heads 34 and which terminates at the exhaust manifold 38 previously referred to and illustrated in FIG. 1. Although exhaust passages 62 may be Siamesed, if preferred, individual passages may be employed for each exhaust valve seat 61.

Exhaust valves 63 are slidably supported for reciprocation in the cylinder head 34 by valve guides 64 that are inserted into the cylinder head 34 in any suitable manner. The axes of reciprocation of the exhaust valves 63 lie in a common plane 60 that is disposed at an angle $\theta_e$ to the plane containing the cylinder bore axis 41. The angle $\theta_e$ is less than or equal to the angle $\theta_s$ of the side intake valves and substantially greater than the angle $\theta_c$ of the center intake valve.

Coil compression springs 65 encircle the stems of the exhaust valves 62 and act upon keeper retainer assemblies 66 for urging these valves to their closed position in seating engagement with the valve seats 61.

The exhaust valves 63 are opened by thimble tappets 67 that are slidably supported in bores 68 formed in the cylinder head 34. The bores 68 extend parallel to the axes of reciprocation defined by the valve guides 64 and extend downwardly from the upper cylinder head surface, as described in the aforenoted copending application, Ser. No. 08/363,412.

An exhaust cam shaft 69 is provided that has individual cam lobes 71 that engage each of the exhaust valve tappets 67 for operating them. The exhaust cam shaft 69 is journaled in the cylinder head 34 in the manner also described in copending application Ser. No. 08/363,412, which includes bearing caps 72.

As has been noted, the intake and exhaust cam shafts 57 and 69 are driven from the engine crankshaft 31 at one-half crankshaft speed. Any of a wide variety of types of cam shaft drives may be employed, including that described in copending application Ser. No. 08/368,412. As seen in FIG. 2, the intake camshaft 57 rotates about a rotational axis that is disposed at a lesser distance $L_1$ from the cylinder bore axis 41 than is the axis of rotation of the exhaust camshaft 69, this latter distance being indicated by the reference character $L_2$.

The area between the intake and exhaust camshafts 59 and 61 centered over each of the cylinder bores 25 is provided with a spark plug well that extends along an axis indicated at 73 and which is disposed at an acute angle $\theta_p$ relative to the plane containing the cylinder bore axis 41 and to the plane 46. A spark plug 74 is disposed at the lower end of this well for each cylinder bore 25 and extends into the cylinder head recess 39 for firing the charge which is introduced thereto through the induction system which will now be described.

The induction system 37 of this embodiment will now be described by initial reference to FIGS. 1–6. As has been noted, this induction system 37 is positioned in the valley 36 between the cylinder banks 23 and 24 and cooperates with the cylinder head surfaces 47 for supplying a fuel air charge to the induction passage 46 of the cylinder heads 34.

The induction system 37 includes a plenum chamber, indicated generally by the reference numeral 75 and which extends generally longitudinally of the engine through the valley 36. The plenum chamber 75 is spaced from the cylinder block 22 and cylinder heads 34 so as to define an air path therearound through which air can circulate for cooling. This improves the volumetric efficiency of the engine.

The plenum chamber 75 is formed from an open topped box-like member 76 that has its open upper face closed by a flange 77 of an intake manifold, indicated generally by the reference numeral 78, that is affixed thereto by threaded fasteners 79 (FIG. 2). A throttle body 81 (FIGS. 3–5) having a body portion 82 is affixed to the front of the plenum chamber 75 and supplies air to its interior 83. The throttle body 81 receives air from a suitable air inlet device (not shown) and has an inlet opening 84 in which a pair of flow controlling throttle valves 85 are supported for rotation on respective throttle shafts 86. The throttle valves 85 are operated by a suitable external accelerator control and open in unison.

The throttle body 81 has a curved section 87 downstream of the throttle valves 85 and which blends into the plenum chamber 75 so as to deliver the air to its internal chamber 83. Various types of sensors such as a temperature sensor and/or air flow sensor (not shown) may be associated with the throttle body 81 for sensing the condition and volume of the air inducted.

The intake manifold assembly 78, which includes a plurality of runner sections, indicated generally by the reference numeral 88, which all have flanges 89 that are common with the flange 77 that closes the upper end of the plenum chamber 75. These flanges 89 are affixed to a control valve assembly, indicated generally by the reference numeral 91, at each cylinder head surface 47.

From the flanges 89, the runner sections 88 include tubular portions that extend upwardly and then transversely across the valley 36. In the area above the plenum chamber 75, the manifold runners 88 divide into a pair of inlet branch sections which are comprised of a first high-speed branch sections, indicated by the reference numeral 92, and all of which are disposed on the longitudinal centerline of the engine. It should be noted that the runners 88 from the cylinder bank 23 extend transversely across toward the cylinder bank 24, while the runners 88 extending from the cylinder bank 24 extend transversely across toward the cylinder bank 23. The branch sections 92 for the runners 88 from each cylinder bank lie in a common longitudinal plane, for a reason which will be described.

A second branch section 93 also branches off the main section 88 and extends parallel to the first branch section 92 in a re-entrant fashion with the section 88, but which is disposed adjacent the opposite cylinder bank. That is, the branch sections 93 from the cylinder bank 24 terminate adjacent the cylinder bank 23. Those branch sections 93 from the cylinder bank 23 terminate adjacent the cylinder bank 24. These branch sections 93 terminate in lower end surfaces 94 which extend in the same plane as the flanges 89 and 77. The branch sections 92 terminate in lower end faces 95 that are positioned vertically above the end surfaces 94.

The branch sections 92 are tuned for high-speed volumetric efficiency and good running. To further assist in their turning each has affixed to it within the plenum chamber 75, and specifically its internal volume 83, tuning necks 96 which have flange portions 97 that are affixed to the lower ends 95 of the branch sections 92 in a suitable manner. The tuning necks 96 are curved back toward the respective cylinder bank from which they originated and terminate in inlets 100. The combined length of the tuning necks 96, branch portions 92, and common portion 88, as well as the intake passages 46 of the cylinder head, have a length that is chosen to provide good volumetric efficiency for the engine when running at high-speed, high-load conditions.

A throttle valve mechanism, indicated generally by the reference numeral 98, is provided for controlling the flow through these high-speed branch passages. This throttle valve assembly 98 is positioned in the branch portion 92 of the intake manifold 78 and includes a longitudinally extending throttle valve shaft 99. Since the branch passages 92 are offset from the branch passages 93, the throttle valve shaft 99 extends only through the branch passages that are designed to be throttled. Thus, the throttle valve shaft 99 and the individual throttle valves 101 which are affixed to it and which complete the throttle valve assembly 98 only pass through the branch passage which they control.

A suitable servomotor such as a vacuum motor 102 is affixed to the forward end of the throttle valve shaft 99 and operates the throttle valve assembly 98 in a control sequence which will be described later by reference to FIGS. 11–17. This vacuum motor 102 may be controlled either by a staged linkage system or, more preferably, by an ECU that is programmed with the desired control strategy.

Longer tuned intake trumpets 103 have flange portions 104 that are affixed to the underside of the plate section 77 of the intake manifold 78 and which register with the secondary branches 93 of each intake runner 78. These longer tuned trumpets 103 have inlet ends 105 disposed at the lower end of the plenum chamber 83 and are tuned to provide better induction efficiency in the low and mid-range speeds. It should be noted that the turning trumpet 103 associated with the first cylinder of the bank 23 and the tuning trumpet 103 associated with the last cylinder of the bank 24 are rotated so that these will face inwardly while the remaining trumpets extend generally parallel to the high-speed necks 99. As may be readily seen from FIG. 4, this permits the plenum chamber to be narrower at the front and rear ends of the engine than the remainder of the plenum chamber 75. This accommodates other engine accessories and maintains a compact intake system while at the same time permitting the desired tuning effect to be obtained.

The construction of the control valve assemblies 91 will now be described by reference to FIGS. 1–3 and 6–10, with the operation thereof being described later by reference to FIGS. 11–17. It should be noted that the induction system 37 as thus far described and the configuration of the cylinder head induction passages 46 are such that the charge that enters the combustion chambers will flow relatively smoothly and with a relatively small amount of turbulence. However, the positioning of the side intake valve seats 42 is such that the air flow into the combustion chambers from them will have some tumble type motion. However, the induction system per se is designed so as to minimize flow restrictions to maximize volumetric efficiency. This, however, may give rise to poor or low speed running characteristics wherein turbulence is desirable.

The control valve assemblies 91 are employed so as to redirect the charge and give a desired turbulence factor to it.

The control valve assemblies 91 each include a valve body 106 which, as has been noted, is interposed between the manifold runners flanges 89 and the induction passages 46 of the cylinder heads 34. The valve body 106 has a flow passage arrangement, indicated generally by the reference numeral 107, which is comprised of a pair of portions 108 and 109 which are complementary to the inlet openings to the cylinder head intake passage sections 48 and 49, respectively. The passages 108 are separated by a wall 110.

Figure 12:
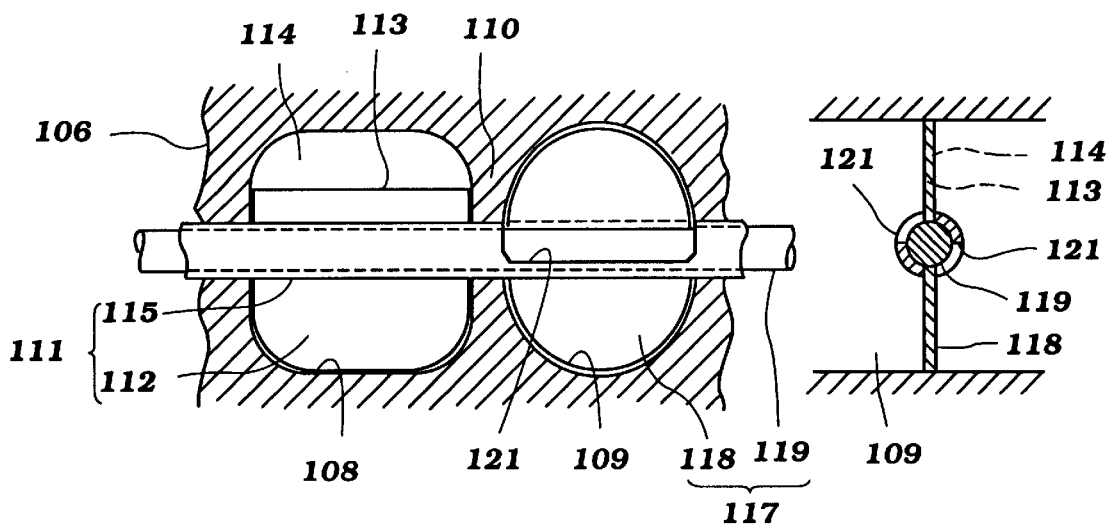
FIGS. 12–14 are views taken in the same direction as FIGS. 9–11 and also showing cross-sectional views taken perpendicular thereto with the control valve and throttle valve in the three positions represented by the three portions of FIG. 11.
Figure 13:
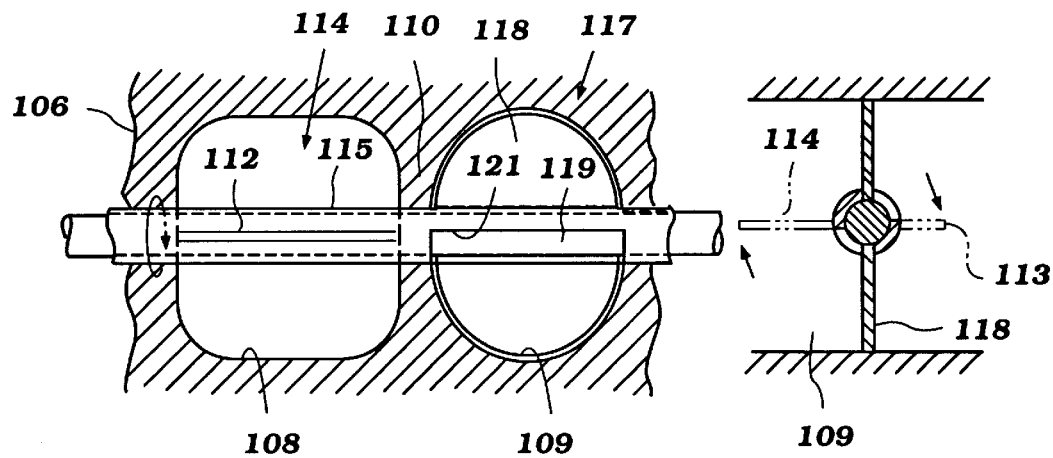
Figure 14:
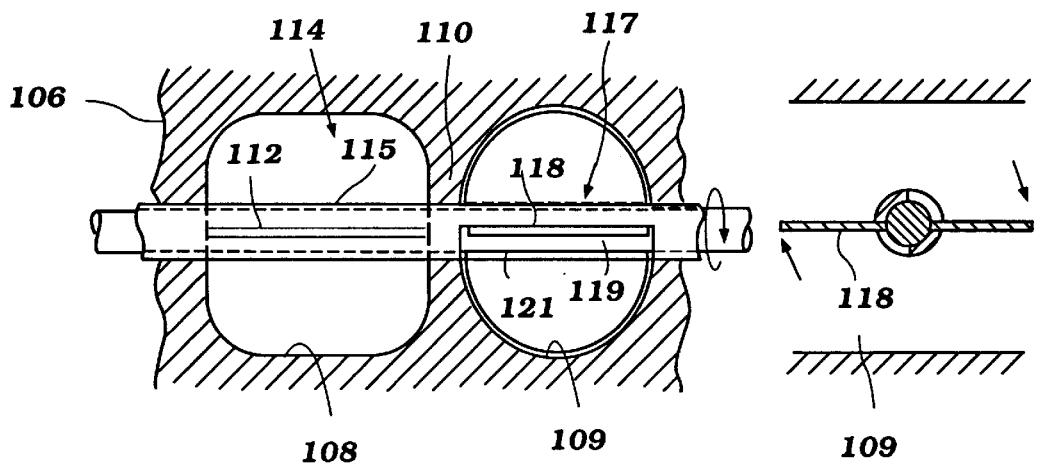
Figure 15:
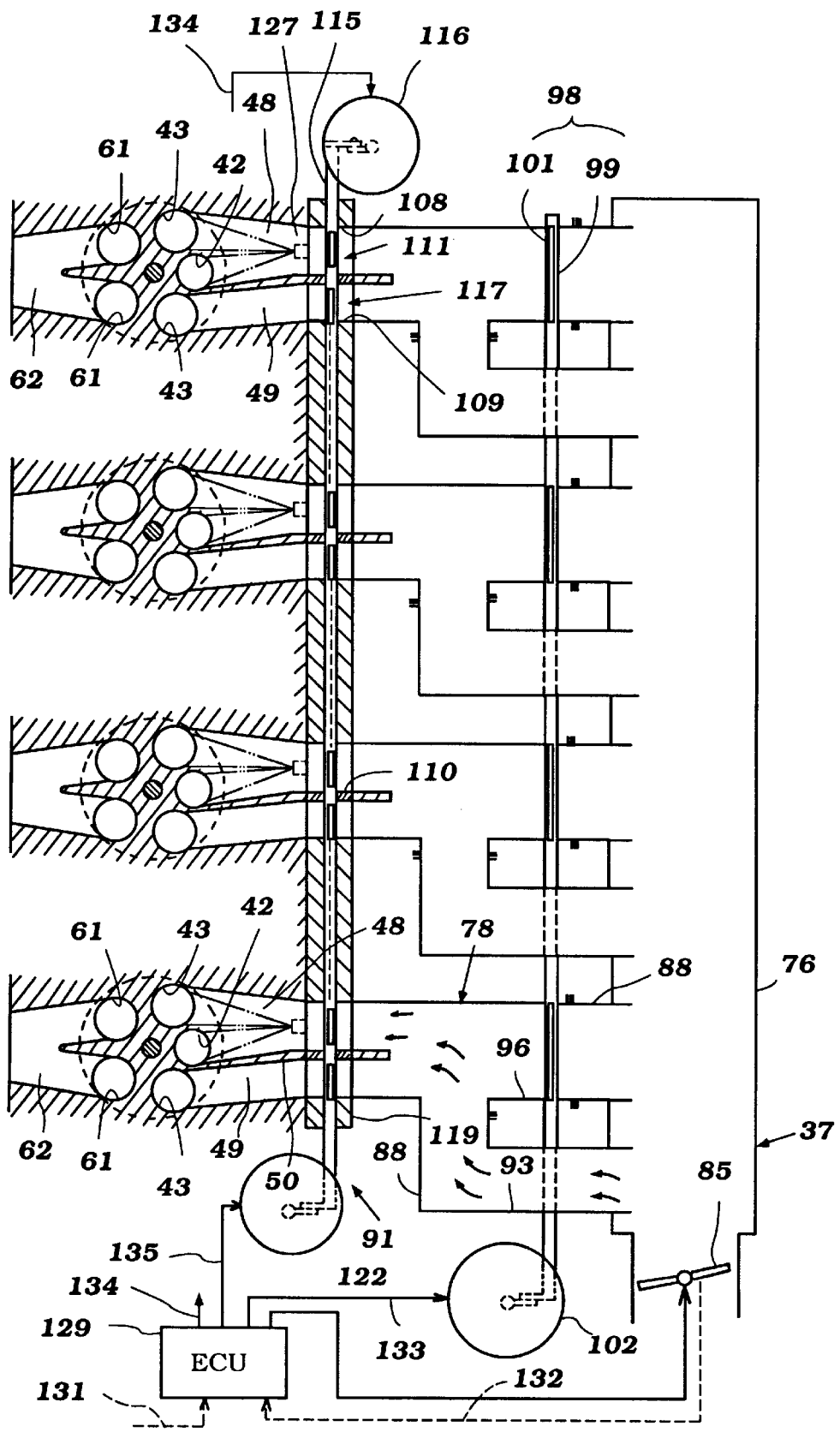
FIG. 15 is a partially schematic cross-sectional view showing one cylinder bank and its induction system when operating at an idle or low-speed condition and showing the position of the throttle valves and flow control valves and corresponding to the conditions shown at the left hand side of FIG. 11 and in FIG. 12.
Figure 16:
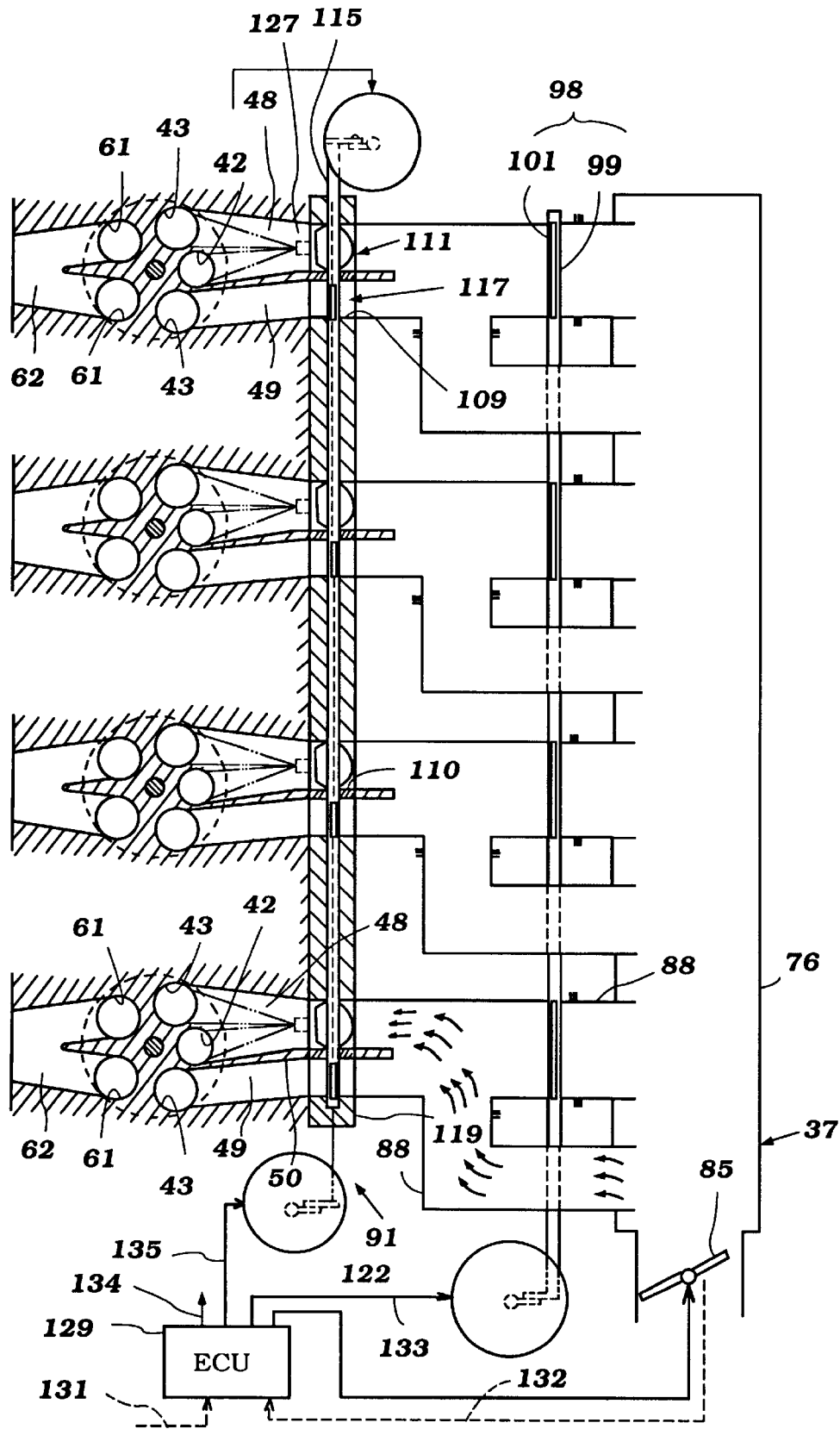
FIG. 16 is a schematic view, in part similar to FIG. 15, and shows the condition of the valves when operating in an off idle low or low/mid-range condition and corresponding to the conditions shown at the center of FIG. 11 and in FIG. 13.
Figure 17:
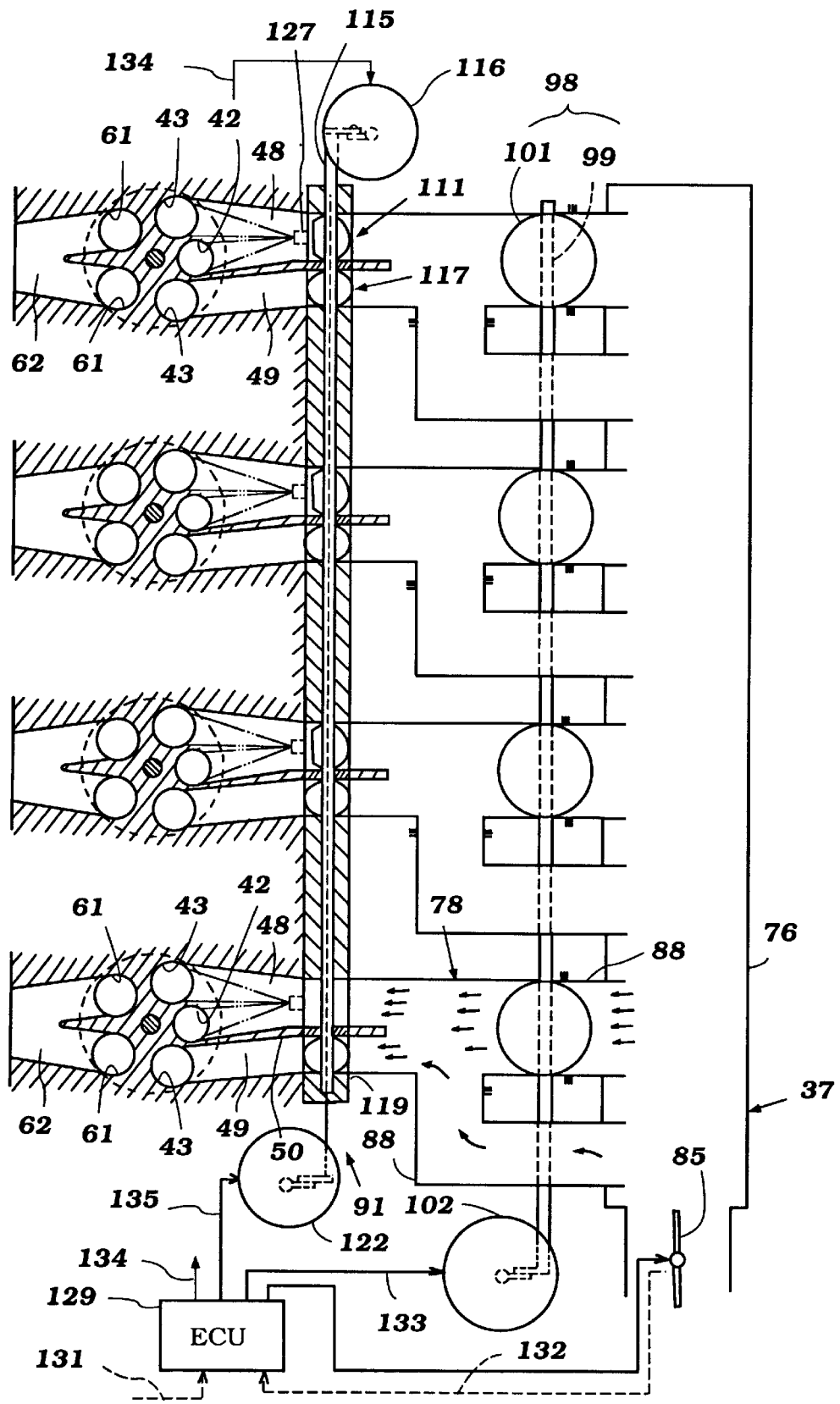
FIG. 17 is a partially schematic view, in part similar to FIGS. 15 and 16, and shows the wide open throttle condition and corresponding to the condition on the right hand side of FIG. 11 and in FIG. 14.

As may be best seen in FIGS. 12–14, the passages 108 and 48, which are considered the primary passages in this embodiment, have a generally square configuration. The passages 109 and 49, which are considered the secondary passages, have a more oval configuration. It will be understood, however, that the actual shape of these passages may depend upon the overall configuration and operation of the engine.

The control valve arrangement of the control valve assembly 91 includes a first flow control valve 111. The control valve 111 is generally a plate-type valve comprised of a valve plate 112 having a cut-off portion 113 formed on its upper peripheral edge so as to define a flow opening 114 when the valve 112 is in its closed or flow controlling position, as shown in FIG. 6 and in the left-hand view of FIG. 11 and in FIGS. 12 and 15. In this position the air flow through the manifold runners 88 and primary intake passages 108 and 48 will be directed toward the top of the intake passage 48 of the cylinder head so as to flow more toward the side of the center valve seat 42 and the one side valve seat 43 served by the intake passage 48 toward the plane containing the cylinder bore axis 41. This will direct more flow toward the other side of the cylinder bores 25 and effect a tumble action so as to increase the turbulence in the combustion chamber.

The plate-type control valve 111 is affixed to a tubular control valve shaft 115 which extends through both the primary intake passage 118 of the valve body 106 and also the secondary intake passage 109. This tubular control valve shaft 115 extends beyond one end of the valve body 106, as shown best in FIGS. 3, 7, and 15–18, for connection to a vacuum-type servomotor 116. This servomotor 116 is operated in accordance with a control strategy, as will be described.

Flow through the secondary intake passage 109 of the control valve assembly 91 is controlled by a flow controlling throttle-type valve, indicated generally by the reference numeral 117. The flow controlling throttle valve 117 is comprised of a plate-type throttle valve 118 which has an exterior configuration which is complementary to the intake passage 109 of the control valve body 106, so that when in its closed position, as shown in FIG. 6, the left and center views of FIG. 11 and in FIGS. 12, 13, 15, and 16, there will be no flow permitted through the secondary intake passage 109 nor through the secondary intake passage 49 of the cylinder head. Hence, all of the flow will be introduced into the combustion chamber through the center intake valve seat 42 and one side intake valve seat 43 so that not only will a tumble be generated to the charge which is introduced when the control valve 111 is in its closed position, but also a swirl will be introduced, regardless of the position of the control valve 111, so long as the throttle control valve 117 is closed. Hence, two types of motion can be accomplished with this arrangement. First, a swirl and tumble, and second, a swirl. The way in which this is done will be described later by reference to FIGS. 11–17.

The plate-type throttle valve 118 is affixed to a throttle control shaft 119 which extends through the tubular throttle control shaft 115. In order to permit movement of the flow control valve 111 independently of the throttle control valve 117, the tubular shaft 115 is provided with cutouts 121 which will permit relative movement, as will be described.

The throttle control shaft 119 extends through both the secondary intake passages 109 and also the primary intake passages 108 of the valve body 106 and extends beyond the end of the valve body 106 at the end opposite the servomotor 116. A further vacuum-operated servomotor 122 is affixed to the throttle valve shaft 119 for operating it.

As should be apparent from the foregoing description, the individual intake manifold runners 88 which serve the individual cylinder bores 25 of the engine have a common section of fair length. The length of this common section can be varied in the manner aforedescribed. If desired, a splitter section 123 (FIG. 6) may be provided at the flange portions 89 of the intake manifold 78 and extend into this common section so as to direct the flow indicated by the arrows 124 and 125 in FIG. 6 to the primary and secondary intake passages formed by the control valve passages 108 and 109 and cylinder head passages 48 and 49, respectively. These splitter sections 123 are not illustrated in all of the figures and may be considered to be optional.

The induction system as thus far described has only dealt with the way in which the air is delivered to the individual combustion chambers of the engine. The valve body 106 is also provided with nozzle receiving sections 126, shown best in FIGS. 2, 3, and 7, that receive fuel injection nozzles 127. These fuel injection nozzles 127 may be of the electronically operated type and receive fuel from fuel rails 128 and spray it into the valve body 106 and cylinder head intake passageway 48, as shown in FIG. 6. Hence, under all running conditions in this embodiment, all of the fuel is delivered to the combustion chamber through the cylinder head intake passage 48. This provides no difficultly, regardless of whether the flow controlling throttle valve 117 is opened or closed. Rather, when the flow controlling throttle valve 117 is open, additional fuel is supplied, and this fuel will be well mixed in the combustion chamber and fully burned. Of course, other positions for the fuel injectors 127 may be adopted.

As has been noted, the position of the throttle valve assemblies 98, which control the effective length of the induction passages, is accomplished by a servomotor 102, which is controlled by an electronic control ECU. This unit is shown schematically in FIGS. 15–17 and is identified by the reference numeral 129. This ECU receives certain signals indicative of engine running and/or ambient conditions. This may include a speed signal, indicated schematically at 131 in this figure, which is derived from a pulser coil in the ignition system or the like. In addition, a load signal, indicated schematically at 132, may be supplied. Engine load may be determined by the position of the manually operated throttle valve 85, as this indicates operator-desired performance.

The ECU 129 outputs control signals to control the servomotors 102, 116, and 122. These control signals are indicated schematically at 133, 134, and 135 in FIGS. 15–17. Although the control routine described will be a preferred one, it will be obvious to those skilled in the art that the various parameters may be altered and, as noted, various other signals may be employed in the control strategy.

Basically, the system operates so that at low speed and low loads the flow controlling throttle valves 98 are maintained in a closed position so that the effective length of the intake runners 88 serving the intake passages 48 and 49 are relatively long. Also, the flow controlling throttle valves 117 are maintained in a closed position, so that the intake charge will be delivered primarily to the combustion chambers through the center intake valve seat 42 and the one side intake valve seat 43. Because the flow is off-center in the cylinder, this will induce a swirl to the intake charge. In addition, the control valves 111 are closed, so as to introduce a tumble to the intake charge under this condition, so as to further increase the turbulence in the combustion chamber and promote more rapid flame propagation. This control routine stage is indicated by the reference character A and is shown in the left-hand side of FIG. 11 and in FIGS. 12 and 15.

As the engine speed and/or load increases, the ECU 129 outputs the signal 134 to the servomotor 116 to effect opening of the control valves 111. At this time the flow controlling throttle valves 117 are maintained in their closed position, and hence the flow condition is as shown in the centerline view of FIG. 11 and in FIGS. 13 and 16.

Under this condition there is still a long effective flow path for the intake runners 88, since the flow controlling throttle valves 98 are closed, and also there will be a higher velocity of the intake charge and a swirl generated because the flow controlling throttle valves 117 are closed. Hence, there will still be some turbulence in the combustion chamber and some flow control in the motion, but less than before. This condition is maintained in the mid-range running and up to high-speed, high-load conditions, and is indicated by the control region B.

Finally, as the engine reaches a high-load and high-speed condition, and as the manually operated throttle valve 85 is more fully opened, the system moves into the control phase C. This is shown in the right-hand side of FIG. 11 and in FIGS. 14 and 17. Under this condition the flow controlling throttle valves 117 are opened, and also the throttle valves 98 are opened, so as to provide a shortening in the effective length of the intake system and also a larger flow area. Hence, high power outputs are possible.

Figure 18:
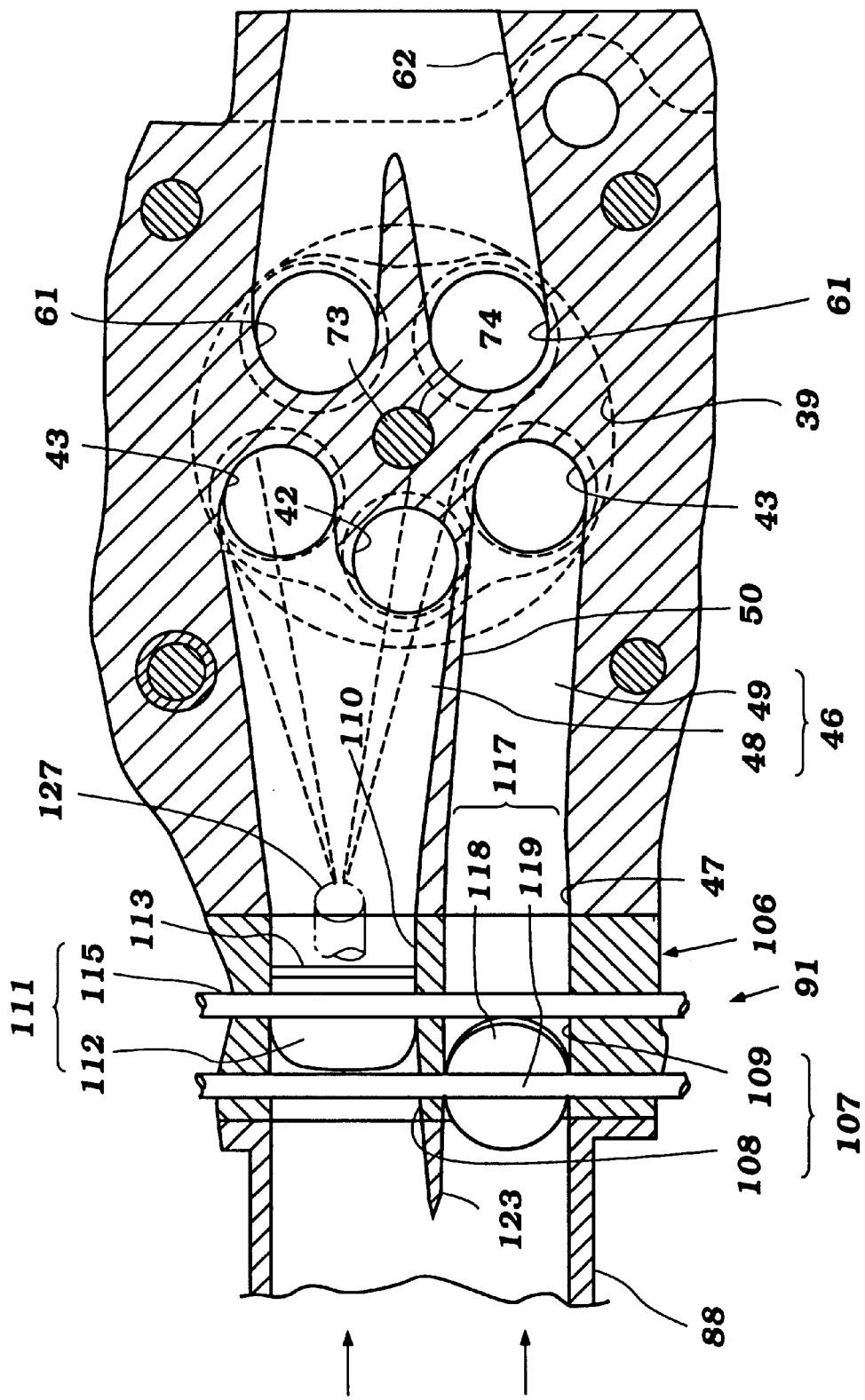
FIG. 18 is a cross-sectional view, in part similar to FIG. 6 and shows another embodiment of the invention.
Figure 19:
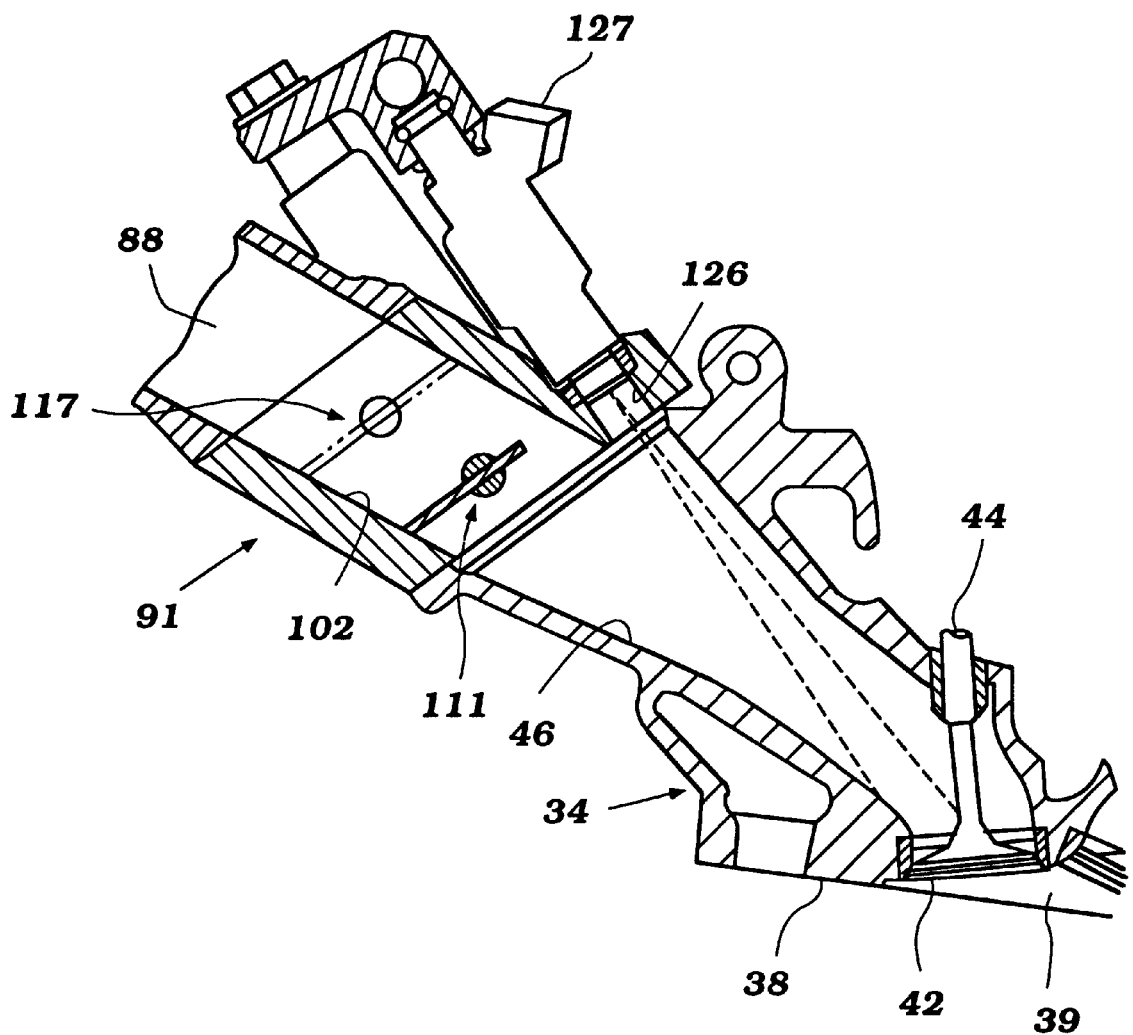
FIG. 19 is a cross-sectional view of the embodiment of FIG. 18 taken along a plane perpendicular to that of FIG. 18.
Figure 20:
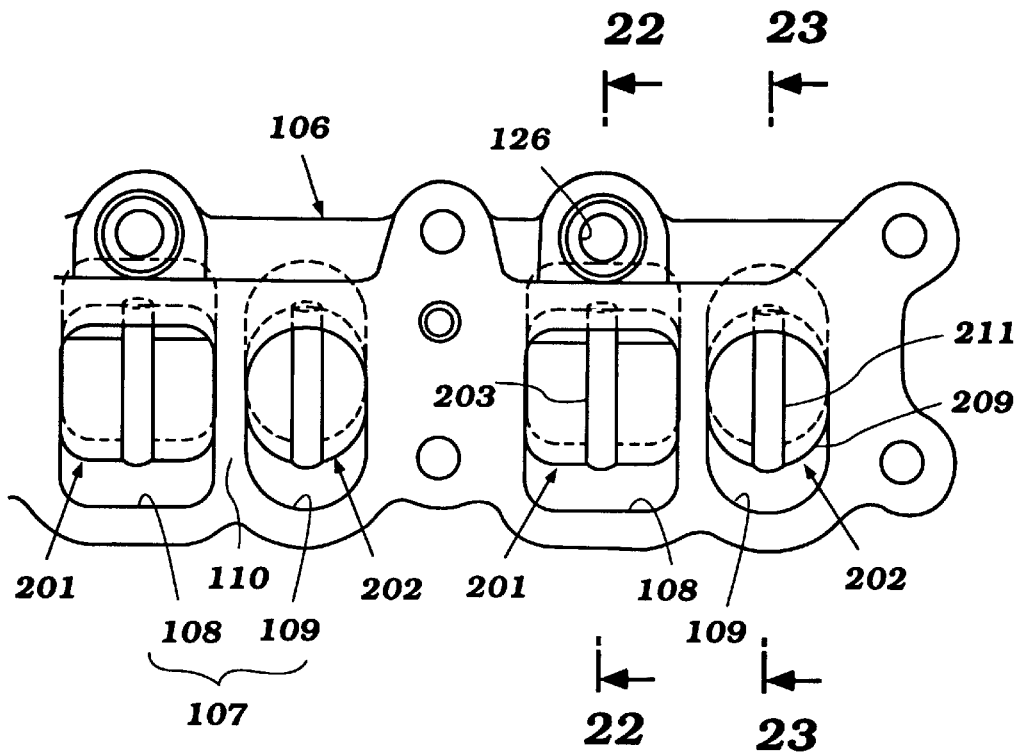
FIG. 20 is an enlarged view, in part similar to FIG. 7, and shows another embodiment of this invention.

In the embodiment of the invention as thus far described, the control valve shafts 115 and 119 were not only parallel, but also coaxial, with one shaft being positioned and journalled inside the other. FIGS. 18 and 19 show another embodiment which differs from the previously described embodiment only in the fact that these shafts are parallel and spaced from each other rather than coaxial. For this reason, components in this embodiment are identified by the same reference numeral because this is the only difference. For the same reason, additional figures are not believed to be necessary to understand the construction and operation of this embodiment. In this embodiment it should be noted that the flow controlling valve 111 is disposed closer to the combustion chamber than the flow controlling throttle valve 117. This closer positioning can be employed to further augment the tumble action which is created when the flow controlling valve 111 is in its closed position.

In the embodiments of the invention as thus far described, the control valve shafts 11S and 119 associated with the respective control valve assemblies 111 and 117 have extended longitudinally of the engine and parallel to the axis of rotation of the crankshaft 31 and the camshafts 57 and 69. FIGS. 20–23 show another embodiment which differs from that previously described only in the orientation of the shafts of the respective control valves. The shape of the passages which they control are the same, and the flow controlling valve is indicated generally by the reference numeral 201 and the throttle controlling valve is indicated generally by the reference numeral 202. All other components which are the same are identified by the same reference numerals and will not be described again, except insofar as is necessary to understand the construction and operation of this embodiment.

The flow controlling throttle valve 201 is comprised of a valve shaft 203 which extends generally perpendicularly to the axes of rotation of the intake and exhaust camshafts 57 and 69 and the crankshaft 31. Hence, the shafts 203 associated with each cylinder are separate from each other. Affixed to each of the shafts 203 is a control valve plate 204 which has a shape complementary to the passage 108, but which is cut off at its upper end as at 205 so as to provide a flow passage 206 when in the closed position that is disposed on the upper side of the flow passage 108 so as to generate a tumble action to the intake charge entering the cylinder, as described with the preceding embodiment.

Levers 207 (FIG. 22) are connected to one end of each of the valve shafts 203 and are connected by a linkage arrangement 208 to the servomotor 116 for simultaneous actuation.

Figure 21:
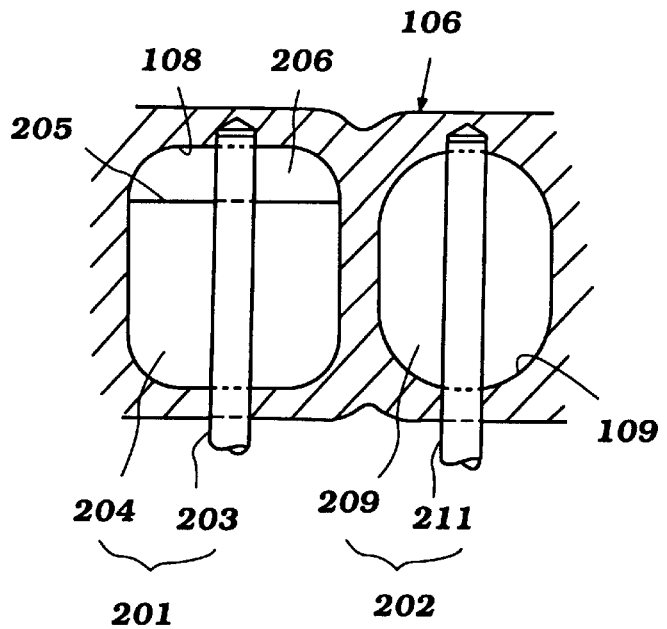
FIG. 21 is a further enlarged cross-sectional view showing the throttle valve and flow control valve of the valve body assembly of this embodiment in relation to a single cylinder of the engine.
Figure 22:
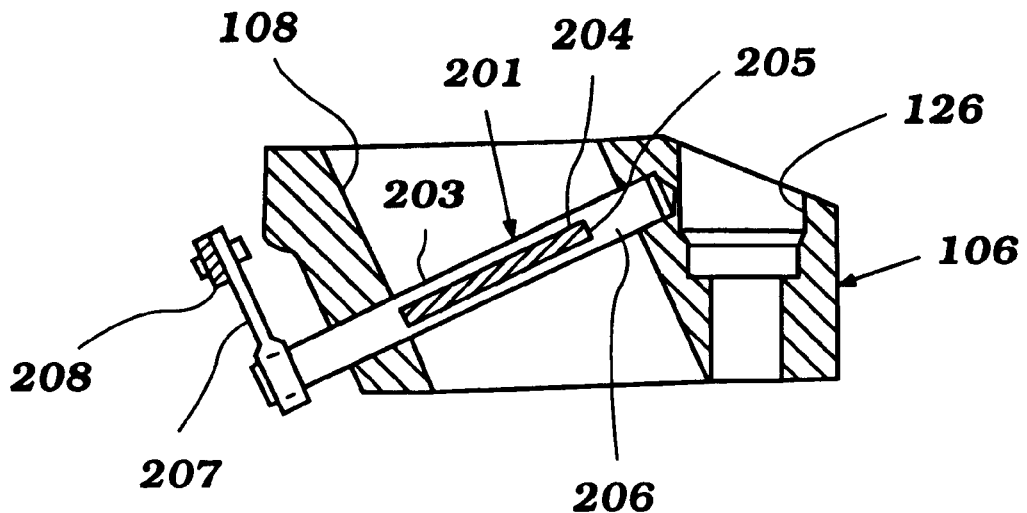
FIG. 22 is a cross-sectional view taken along the line 22—22 of FIG. 20.
Figure 23:
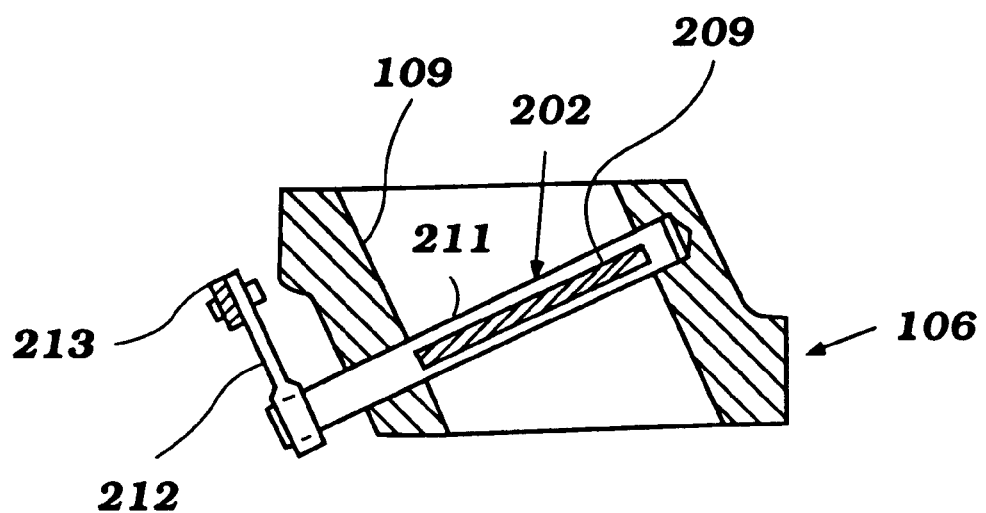
FIG. 23 is a cross-sectional view taken along the line 23—23 of FIG. 20.

The flow controlling throttle valves 202 control the flow through the passages 109 and are comprised of plate-type valves 209 which have a configuration complementary to the passages 109 when in their closed position, as shown in FIG. 21. These valve plates 209 are affixed to respective valve shafts 211, which are rotatably journalled in the valve body 106 about axes that are parallel to, but offset from, the axes of the control valve shafts 203.

Like the valve assemblies 201, the shafts 211 of the flow control throttle valves 202 extend beyond one side of the valve body 106 and have levers 212 affixed to each of them which are interconnected by a linkage 213. This linkage 213 is coupled to the servomotor 122 for simultaneous actuation of the control valves 202.

Figure 29:
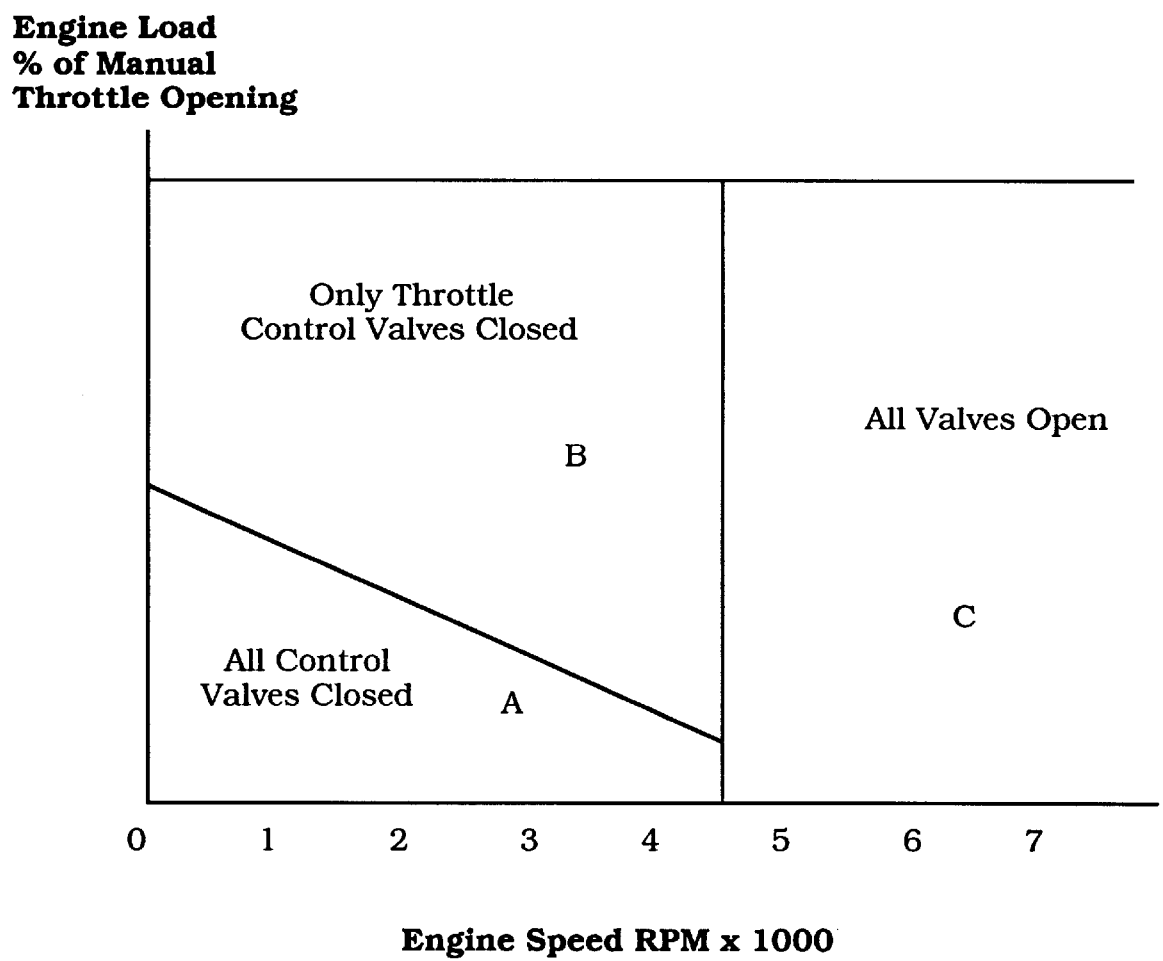
FIG. 29 is a graphical view showing the various control positions of the various throttle and control valves in response to engine speed and load.

Again, any desired type of strategy can be employed for operating the valves 201 and 202, including that previously described. By the way, such a strategy is depicted in FIG. 29 and will be described later by reference to that figure, which shows how the control routine may be varied under varying speed and load conditions.

In all of the embodiments as thus far described, the flow controlling valve assemblies have been such so as to generate a tumble action under low-speed and low-load conditions, which is augmented by a swirl. As the load and speed increases, the tumble action is decreased, and then eventually the swirl is decreased.

Figure 24:
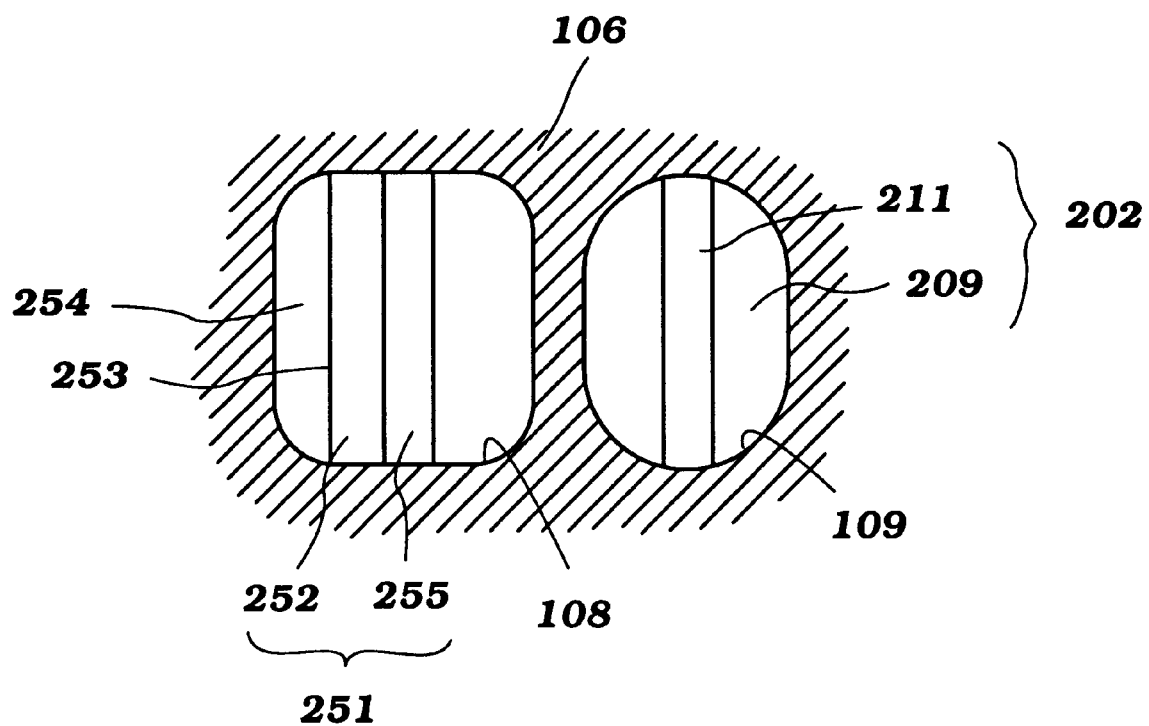
FIG. 24 is a cross-sectional view, in part similar to FIG. 21 and shows a still further embodiment of the invention.

FIG. 24 shows a valve assembly which is similar to that of FIGS. 20–23, but wherein the amount of tumble generated is reduced and the amount of swirl is increased. In this embodiment only the flow controlling throttle valve, which is indicated generally by the reference numeral 251, differs from the previous embodiment, and for that reason where components of this embodiment are the same as that previously described, they are identified by the same reference numerals and will be described again only insofar as is necessary to understand the construction and operation of this embodiment.

In this embodiment the flow controlling valve 251 includes a valve plate 252 which has a configuration generally the same as the intake passage 108 of the valve body 106. However, unlike the previously described embodiments, a cutout 253 is formed on the plate 251, which extends along one side of the passage 108 and which defines an air flow gap 254. This flow gap 254 directs the flow more toward the side of the one side intake valve seat 43 so as to reduce the amount of tumble which is generated, but to increase the amount of swirl.

The valve plate 252 is affixed to a valve shaft 255, which is journalled in the valve body 106 about an axis perpendicular to the camshaft axes and crankshaft axis and parallel to the shaft 211 of the flow controlling throttle valve 202. In all other regards, this embodiment is the same as those previously described, and for that reason, a further description of this embodiment is not believed to be necessary to permit those skilled in the art to practice this embodiment.

In all of the embodiments thus far described, the flow controlling valves have comprised plate-type or butterfly-type valves. This includes the control valves 111 of the embodiment of FIGS. 1–17, the same control valve 111 of the embodiment of FIGS. 18 and 19, the control valve 201 of FIGS. 20–23, and the control valve 251 of FIG. 24. With each of these embodiments the supporting control valve shaft passes through the valve body intake passage 118, and hence, even when the control valve is fully opened, there is some flow restriction.

FIGS. 25–28 show another embodiment that employs a different form of control valve so as to avoid this flow restriction when the control valve is not in its flow controlling position. In this embodiment this control valve is indicated generally by the reference numeral 301 and is mounted not in the valve body 106, but rather directly in the cylinder head 34. Aside from this difference and one further difference which will be noted, the construction is the same as the previously described embodiments, and for that reason, a detailed description of those components which are the same is not believed to be necessary to understand the construction and operation of this embodiment.

Figure 26:
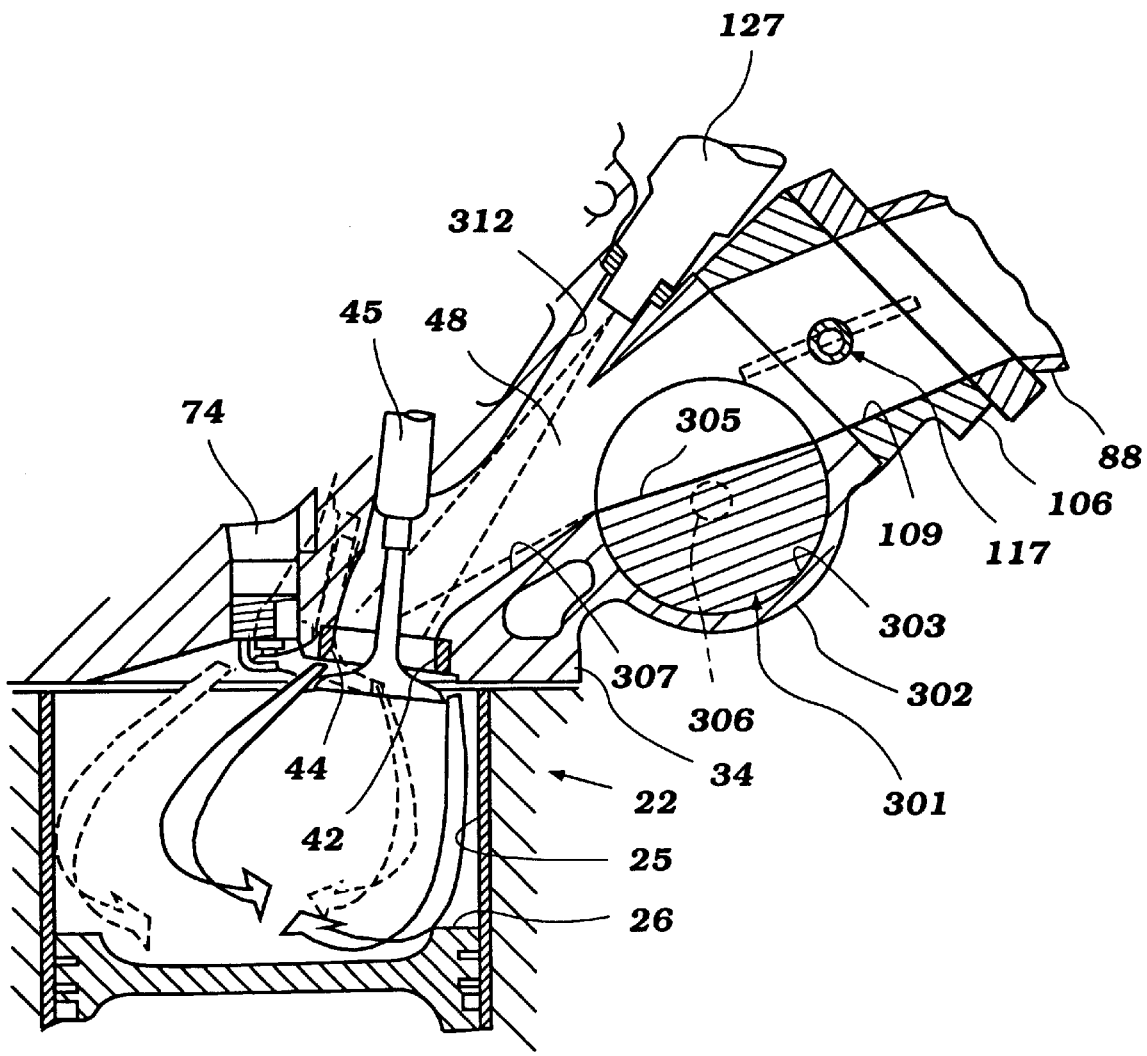
FIG. 26 is a cross-sectional view, in part similar to FIG. 25, and shows the flow control valve in its fully opened position in the high speed, high load condition.
Figure 28:
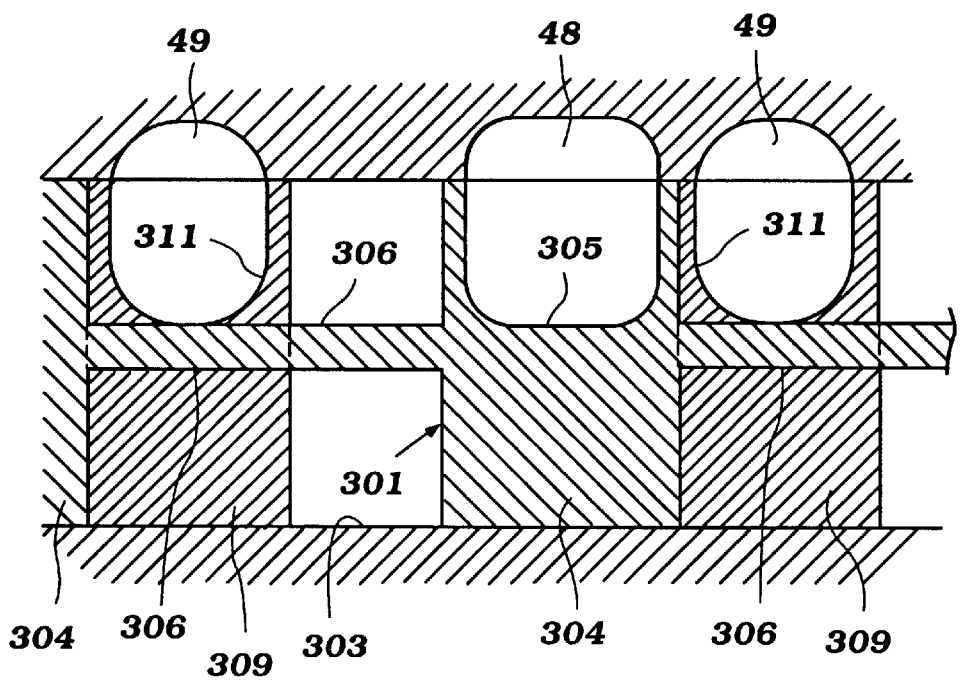
FIG. 28 is a cross-sectional view taken along the line 28—28 of FIG. 26.

In this embodiment the cylinder head 34 is provided with a protuberance 302 on its lower side that defines a cylindrical bore 303. This bore 303 is of such a diameter that it will extend into the intake passage portions 48 and 49 of the cylinder head 34. The control valve 301 has a plurality of valving segments, each indicated by the reference numeral 304, which extend into the bore portions 303 adjacent the cylinder head intake passage portions 48. These valving elements 304 have their cylindrical outer surface provided with a recess 305 that is formed by a cut-out portion which, when in the opened position as shown in FIGS. 26 and 28, will be moved free of any interference with the intake passage 48 so that there is unobstructed and smooth flow through it. The surface of the cutout 305 is disposed so that it will be aligned with a lower cylinder head surface 306 which defines the lower portion of the intake passage 48 so that there will be unobstructed and smooth flow in this position.

Figure 25:
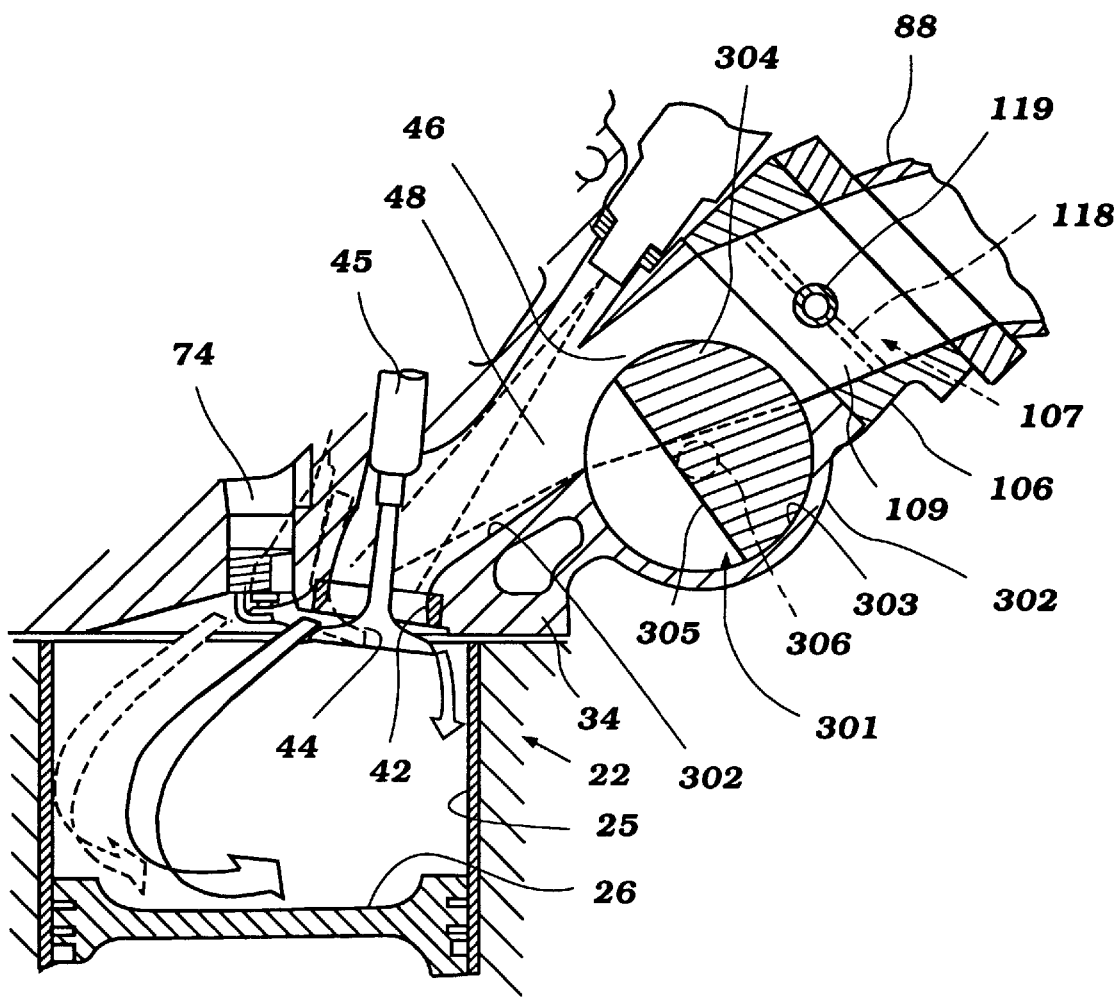
FIG. 25 is an enlarged cross-sectional view taken along a plane similar to that of FIG. 2 and shows a still further embodiment of the invention in the low speed, high load condition.
Figure 27:
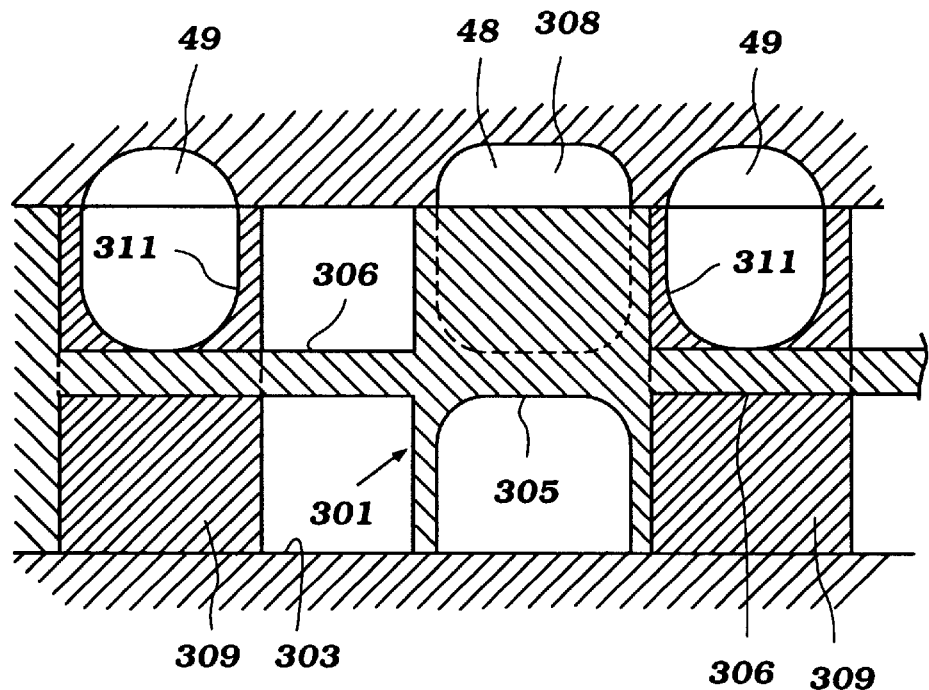
FIG. 27 is a view taken along the line 27—27 of FIG. 25.

The valving sections 304 are connected by tubular shaft portions 306 that extend out of one end of the cylinder head 34 for connection to a servomotor like the servomotor 116 of the previously described embodiments so that the valve 301 may be moved from the opened position as shown in FIGS. 26 and 28 to a flow restricting position as shown in FIGS. 25 and 27. In this position the cylindrical portions of the valving elements 304 will move into partially blocking relationship with the intake passage 48 so as to define a narrow opening 308 through which the flow is directed, which will direct the flow through the center intake valve seat 42 and the one side intake valve seat 43 toward the plane containing the axis of the cylinder bore so as to generate a tumble, as shown in FIG. 25 by the arrows. When the valve 301 is in its open position, as shown in FIGS. 26 and 28, there will be flow in opposite directions, so that there will be less turbulence, as previously noted.

Because the bore 303 extends through not only the cylinder head intake passages 48 but also the passages 49, there are provided filler pieces 309 that support portions of the valve shaft 306 adjacent the valving portions 304. These filler pieces 309 are provided with cutouts 311, so as to permit the intake passages 49 to maintain their continuous configuration.

In this embodiment the fuel injectors 127 are mounted in nozzle receiving openings 312 formed in the cylinder head 34 on the side opposite the projection 302.

As has been previously noted, the control for the various valves is in three control domains A, B, and C, with the domain A being that at low speed, low load; that at B being mid-range; and that at C being high load and high speed. These various ranges may be determined in any suitable manner, and FIG. 29 shows one control range in relation to engine load, as determined by a percentage of throttle opening and engine speed. The range A, as previously noted, is the range when all of the control and throttle valves are closed, including those which control the effective length of the induction passage. As may be seen, the transition from range A to range B, wherein only the throttle control valves that control the length and the flow through the one side intake seat are closed, depends upon speed and load. As the speed increases, the load at which the transition takes place will be reduced. After a predetermined engine speed, all of the valves are maintained in their open position.

It should be readily apparent from the foregoing description that the described embodiments of the invention provide a control for an engine induction system, and particularly one having three intake valves per cylinder, wherein high power outputs may be achieved. However, low and mid-range performance is not deteriorated, and in fact is improved by the use of the control and throttle valve arrangements described. Of course, the preceding description is that of preferred embodiments of the invention, and various changes and modifications may be made without departing from the spirit and scope of the invention as defined by the appended claims.

We claim:

1. An induction control system for supplying a charge to an engine combustion chamber comprising intake passage means terminating at port openings in said combustion chamber, said intake passage means having first and second outlet sections divided by a wall, a throttle valve in at least one of said outlet sections for controlling the flow moveable through said one outlet section from a closed to an opened position, a flow control valve in the other of said sections and movable between a first position wherein the flow entering said combustion chamber flows in a first flow path and a second position wherein the flow enters said combustion chamber in a second flow path, and a single fuel injector injecting fuel into only the other of said outlet sections downstream of said flow control valve for providing the entire fuel requirements of said combustion chamber.

2. An induction control system as set forth in claim 1, wherein the flow control valve redirects the flow into the combustion chamber in its second flow path by directing the flow toward a portion of the port opening served by the second outlet section, said flow control valve being effective when in its first position to permit the flow to enter the combustion chamber through the served port opening without any redirection in its flow path.

3. An induction control system as set forth in claim 2, wherein the flow control valve directs the flow toward one side of the served port opening when in its second position.

4. An induction control system as set forth in claim 3, wherein the flow is directed toward the upper side of the port opening when the flow control valve is in its second position for generating at least a tumble action in the combustion chamber.

5. An induction control system as set forth in claim 3, wherein the flow is directed toward a side of the served port opening when the flow control valve is in its second position for generating at least a swirl in the combustion chamber.

6. An induction control system as set forth in claim 1, wherein both of the throttle valve and the flow control valve comprise plate-type valves, with the throttle valve having a shape when in its first position complementary to the first outlet section for precluding flow through the first outlet section, the flow control valve having a shape generally complementary to the second outlet section when in its second position, but being provided with a recessed area in the plate for redirecting the flow through the recessed area when the control valve is in its second position.

7. An induction control system as set forth in claim 6, wherein the plate-type throttle and flow control valves are each supported on a respective control valve shaft, with the axes of rotation of said control valve shafts being parallel to each other.

8. An induction control system for supplying a charge to an engine combustion chamber comprising intake passage means terminating at port openings in said combustion chamber, said intake passage means having first and second outlet sections divided by a wall, a throttle valve in at least one of said outlet sections for controlling the flow through said one outlet section movable from a closed to an open position, and a flow control valve in the other of said sections and movable between a first position wherein the flow entering said combustion chamber flows in a first flow path and a second position where the flow enters said combustion chamber in a second flow path, both said throttle valve and said flow control valve comprising plate-type valves, said throttle valve having a shape when in its first position complementary to said first outlet section for precluding flow through said first outlet section, said flow control valve having a shape generally complementary to said second outlet section when in its second position, but being provided with a recessed area in said plate for directing the flow through said recessed area when said control valve is in its second position, said plate-type throttle valve and said plate-type control valve each being supported on a respective control valve shaft, the axes of rotation of the control valve shafts being concentric.

9. An induction control system as set forth in claim 8, wherein one of the control valve shafts is tubular and the other control valve shaft is journalled in the tubular control valve shaft, the valve plate affixed to the non-tubular valve shaft extending through a slotted opening in the tubular valve shaft.

10. An induction control system as set forth in claim 9, wherein the slotted openings have sufficient arc so as to permit free movement of the valve affixed to the tubular shaft between its first and second positions when the other valve is in its second position.

11. An induction control system as set forth in claim 10, further including first and second servomotors, each affixed to a respective one of the control valve shafts for operating the control valve shafts.

12. An induction control system as set forth in claim 11, wherein the first and second servomotors are disposed at opposite ends of the engine.

13. An induction control system as set forth in claim 7, wherein the axes of the valve shafts are disposed in parallel but offset relationship.

14. An induction control system as set forth in claim 13, wherein the axis of rotation of the control valve shaft to which the flow control valve is affixed is closer to the combustion chamber than the axis of rotation of the control valve shaft to which the throttle valve is affixed.

15. An induction control system as set forth in claim 14, wherein both of the control valve shafts pass through both of the first and second outlet sections.

16. An induction control system for supplying a charge to an engine combustion chamber comprising intake passage means terminating at port openings in said combustion chamber, said intake passage means having first and second outlet sections divided by a wall, a throttle valve in at least one of said outlet sections for controlling the flow through said one outlet section movable from a closed to an open position, and a flow control valve in the other of said sections and movable between a first position wherein the flow entering said combustion chamber flows in a first flow path and a second position where the flow enters said combustion chamber in a second flow path, both said throttle valve and said flow control valve comprising plate-type valves, said throttle valve having a shape when in its first position complementary to said first outlet section for precluding flow through said first outlet section, said flow control valve having a shape generally complementary to said second outlet section when in its second position, but being provided with a recessed area in said plate for directing the flow through said recessed area when said control valve is in its second position, said plate-type throttle valve and said plate-type control valve each being supported on a respective control valve shaft, the axes of rotation of the control valve shafts extend in a direction generally parallel to the axis of the cylinder bore that forms the associated combustion chamber.

17. An induction control system as set forth in claim 16, wherein the upper portion of the plate-type control valve is removed so as to provide a tumble action in the combustion chamber.

18. An induction control system as set forth in claim 16, wherein the side of the plate-type flow control valve is removed so as to induce primarily swirl in the combustion chamber.

19. An induction control system for supplying a charge to an engine combustion chamber, said combustion chamber being formed in part by a cylinder bore, said induction control system comprising intake passage means terminating at port openings in said combustion chamber, said intake passage means having first and second outlet sections divided by a wall, a throttle valve in at least one of said outlet sections for controlling the flow through said one outlet section movable from a closed to an open position, and a flow control valve in the other of said sections and movable between a first position wherein the flow entering said combustion chamber flows in a first flow path and a second position where the flow enters said combustion chamber in a second flow path, said port openings comprising three valve seats comprised of a center valve seat disposed furthest from a longitudinally extending plane containing the axis of said cylinder bore and positioned between the remaining valve seats which comprise side valve seats which extend at least in part adjacent said plane, said first outlet section serving one of said side valve seats and said center valve seat and said second outlet section serving the remaining side valve seat.

20. An induction control system as set forth in claim 19, wherein the first and second outlet sections are served by a common section from which first and second inlet sections extend.

21. An induction control system as set forth in claim 20, wherein the first and second inlet sections originate in a common plenum chamber having an atmospheric air inlet in which a manually positioned main throttle valve is provided.

22. An induction control system as set forth in claim 21, wherein the throttle valve and the flow control valve are automatically controlled in response to an engine condition.

23. An induction control system as set forth in claim 22, wherein the engine condition comprises at least engine speed and engine load.

24. An induction control system as set forth in claim 23, wherein the control sequence for the automatically operated valves is such that as the speed and load of the engine increases, the flow control valve is opened first and the throttle valve is opened at a higher speed and higher load.

25. An induction control system as set forth in claim 24, wherein the first and second inlet sections are tuned by providing different lengths therefor.

26. An induction control system as set forth in claim 25, further including a second throttle valve disposed in the first inlet section for controlling the flow therethrough.

27. An induction control system as set forth in claim 26, wherein the second throttle valve is also automatically operated and is maintained in a closed position until after the flow control valve is opened.

28. An induction control system for supplying a charge to an engine combustion chamber through at least two intake ports, a first intake passage section serving a first of said intake ports, a second intake passage section serving a second of said intake ports, a first valve shaft extending through said first and said second intake passage sections, a first valve affixed for rotation with said first valve shaft in said first intake passage section, a second, tubular valve shaft journalled around said first valve shaft and extending through said first and said second intake passage sections, and a second valve affixed to said second tubular valve shaft in said second intake passage section.

29. An induction control system as set forth in claim 28 where in one of said valves comprises a throttle valve for controlling the flow through the respective section from a closed to an opened position and the other valve comprises a flow control valve in the other of the sections and movable between a first position wherein the flow entering said combustion chamber flows in a first flow path and a second position wherein the flow enters said combustion chamber in a second flow path.

30. An induction control system as set forth in claim 29, wherein the flow control valve redirects the flow into the combustion chamber in its second flow path by directing the flow toward a portion of the port opening served by the second outlet section, said flow control valve being effective when in its first position to permit the flow to enter the combustion chamber through the served intake port without any redirection in its flow path.

31. An induction control system as set forth in claim 30, wherein the flow control valve directs the flow toward one side of the served intake port when in its second position.

32. An induction control system as set forth in claim 31, wherein the flow is directed toward the upper side of the intake port when the flow control valve is in its second position for generating at least a tumble action in the combustion chamber.

33. An induction control system as set forth in claim 31, wherein the flow is directed toward a side of the intake port when the flow control valve is in its second position for generating at least a swirl in the combustion chamber.

34. An induction control system as set forth in claim 28, wherein the second valve extends through a slotted opening in the second valve shaft.

35. An induction control system as set forth in claim 34, wherein the slotted openings have sufficient arc so as to permit free movement of the first valve between its first and second positions when the second valve is in its second position.

36. An induction control system for supplying a charge to an engine combustion chamber through at least two intake ports, a first intake passage section serving a first of said intake ports, a second intake passage section serving a second of said intake ports, a first valve shaft extending through said first intake passage section, a first plate type throttle valve affixed for rotation with said first valve shaft in said first intake passage section for controlling the flow therethrough, a second valve shaft extending at least in part through said second intake passage section, and a second plate type throttle valve affixed to said second valve shaft in said second intake passage section for controlling the flow therethrough, the rotational axes of said first and said second valve shafts being parallel to each other and generally parallel to the axis of a cylinder bore that forms the associated combustion chamber.

37. An induction control system as set forth in claim 36 wherein the first throttle valve for controlling the flow through the first section from a closed to an opened position, and the second valve comprises a flow control valve in the second section and movable between a first position wherein the flow entering said combustion chamber through said second intake port flows in a first flow path and a second position wherein the flow enters said combustion chamber in a second flow path.

38. An induction control system as set forth in claim 37, wherein the flow control valve redirects the flow into the combustion chamber in its second flow path by directing the flow toward a portion of the second intake port, said flow control valve being effective when in its first position to permit the flow to enter the combustion chamber through said second intake port without any redirection in its flow path.

39. An induction control system as set forth in claim 38, wherein the flow control valve directs the flow toward one side of the second intake port when in its second position.

40. An induction control system as set forth in claim 39, wherein the flow is directed toward the upper side of the second port intake when the flow control valve is in its second position for generating at least a tumble action in the combustion chamber.

41. An induction control system as set forth in claim 39, wherein the flow is directed toward a side of the second intake port when the flow control valve is in its second position for generating at least a swirl in the combustion chamber.

42. An induction control system as set forth in claim 36, wherein the upper portion of the second plate-type valve is removed so as to provide a tumble action in the combustion chamber.

43. An induction control system as set forth in claim 36, wherein the side of the second pate-type flow control valve is removed so as to induce primarily swirl in the combustion chamber.

\* \* \* \* \*

UNITED STATES PATENT AND TRADEMARK OFFICE
CERTIFICATE OF CORRECTION

PATENT NO. : 6,055,958
DATED : May 2, 2000
INVENTOR(S) : Tateo Aoyama et al.

It is certified that error appears in the above-identified patent and that said Letters Patent is hereby corrected as shown below:

Column 15, claim 1,
Line 46, delete "moveable".

Column 16, claim 8,
Line 29, delete "movable" and insert -- moveable --.
Line 31, delete "movable" and insert -- moveable --.
Line 37, delete "complementary" and insert -- complimentary --.
Line 39, delete "valve"; same line, delete "complementary" and insert -- complimentary --.

Column 17, claim 16,
Line 15, delete "movable" and insert -- moveable --.
Line 17, delete "movable" and insert -- moveable --.
Line 23; delete "complementary" and insert -- complimentary --.
Line 25, delete "valve"; same line, delete "complementary" and insert -- complimentary --.

Column 17, claim 19,
Line 51, delete "movable" and insert -- moveable --.
Line 53, delete "movable" and insert -- moveable --.

Signed and Sealed this

Second Day of October, 2001

Attest:

NICHOLAS P. GODICI
Attesting Officer  Acting Director of the United States Patent and Trademark Office